(12) United States Patent
Ino

(10) Patent No.: US 8,416,374 B2
(45) Date of Patent: Apr. 9, 2013

(54) LIQUID CRYSTAL DISPLAY

(75) Inventor: Masumitsu Ino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/705,366

(22) Filed: Feb. 12, 2007

(65) Prior Publication Data

US 2007/0146593 A1    Jun. 28, 2007

Related U.S. Application Data

(63) Continuation of application No. 10/467,565, filed as application No. PCT/JP02/12967 on Dec. 11, 2002.

(30) Foreign Application Priority Data

Dec. 11, 2001  (JP) ................................. 2001-377239
Apr. 4, 2002   (JP) ................................. 2002-102467
Jun. 14, 2002  (JP) ................................. 2002-174085

(51) Int. Cl.
*G02F 1/1335*  (2006.01)
*G02F 1/1343*  (2006.01)

(52) U.S. Cl.
USPC .............................. 349/114; 349/106; 349/39

(58) Field of Classification Search ........................ None
See application file for complete search history.

(56) References Cited

U.S. PATENT DOCUMENTS

| | | | |
|---|---|---|---|
| 5,124,823 A | 6/1992 | Kawasaki et al. | |
| 5,128,783 A | 7/1992 | Abileah et al. | |
| 5,526,012 A | 6/1996 | Shibahara | |
| 5,920,367 A * | 7/1999 | Kajimoto et al. | 349/162 |
| 6,172,725 B1 | 1/2001 | Lengyel | |
| 6,195,140 B1 | 2/2001 | Kubo et al. | |
| 6,219,120 B1 * | 4/2001 | Sasaki et al. | 349/113 |
| 6,281,952 B1 | 8/2001 | Okamoto et al. | |
| 6,310,670 B1 | 10/2001 | Lee | |
| 6,556,258 B1 * | 4/2003 | Yoshida et al. | 349/61 |
| 2001/0020991 A1 | 9/2001 | Kubo et al. | |
| 2001/0022997 A1 | 9/2001 | Honda et al. | |
| 2002/0159001 A1 | 10/2002 | Kim | |
| 2002/0180911 A1 | 12/2002 | Iijima | |

FOREIGN PATENT DOCUMENTS

| | | |
|---|---|---|
| EP | 973058 | 1/2001 |
| JP | 08-286178 | 11/1996 |
| JP | 11-052347 | 2/1999 |

(Continued)

OTHER PUBLICATIONS

U.S. Appl. No. 10/467,565, filed Jun. 10, 2004, Ino, Matsumisu.

*Primary Examiner* — Wen-Ying P Chen
(74) *Attorney, Agent, or Firm* — Robert J. Depke; The Chicago Technology Law Group, LLC

(57) ABSTRACT

A liquid crystal display able to deal with high definition display and able to secure both of a transmission type display luminance and a reflection type display luminance, wherein light from backlights 71a and 71b are focused by a lens sheet 74, luminance of the backlights is improved, a transmittance can be set at 4 percent to 10 percent, a reflectance can be set in a range from 1 percent to 25 percent, and high definition display is handled while securing a display light luminance equivalent to that of a liquid crystal display performing only transmission type display and a reflection display light luminance required for the display without increasing a power consumption of the backlights.

22 Claims, 29 Drawing Sheets

FOREIGN PATENT DOCUMENTS

| | | |
|---|---|---|
| JP | 11-101992 A | 4/1999 |
| JP | 11-183892 A | 7/1999 |
| JP | 11-242226 | 9/1999 |
| JP | 11-305248 A | 11/1999 |
| JP | 2000-019563 | 1/2000 |
| JP | 2000-111902 | 4/2000 |
| JP | 2000-235180 A | 8/2000 |
| JP | 2000-284268 | 10/2000 |
| JP | 2001-298267 | 10/2000 |
| JP | 2001-083509 | 3/2001 |
| JP | 2001-154181 | 6/2001 |
| JP | 2001-215333 A1 | 8/2001 |
| JP | 2001-290148 A | 10/2001 |
| JP | 2002-229016 A | 8/2002 |
| JP | 2002-287132 | 10/2002 |
| JP | 2002-328370 A | 11/2002 |
| JP | 2002-341342 A | 11/2002 |
| JP | 2002-365625 A | 12/2002 |
| WO | WO 01/08128 | 2/2001 |

* cited by examiner

1 DISPLAY PANEL

FIG. 12

| PNLN | RFL(%) |
|---|---|
| 1 | 4 2 |
| 2 | 3 9 |
| 3 | 3 6 |
| 4 | 4 9 |
| 5 | 4 7 |
| 6 | 4 6 |
| 7 | 4 3 |
| 8 | 3 6 |
| 9 | 4 6 |
| 1 0 | 4 5 |
| 1 1 | 4 2 |
| 1 2 | 3 8 |
| 1 3 | 4 0 |

AVERAGE REFLECTANCE : 42. 23%

40 TFT

81 DISPLAY PANEL

61 DISPLAY PANEL

61A DISPLAY PANEL

LIQUID CRYSTAL DISPLAY

The subject matter of application Ser. No. 10/484,953 is incorporated herein by reference. The present application is a Continuation of U. S. application Ser. No. 10/467,565, filed on Jan. 20, 2004, which is a 371 U.S. National Stage filing of PCT/JP02/12967 filed on Dec. 11, 2002, which claims priority to Japanese Patent Application Numbers JP2001-377239, filed on Dec. 11, 2001, JP 2002-102467, filed Apr. 4, 2002, and JP 2002-174085, filed Jun. 14, 2002, all of which are incorporated herein by reference.

TECHNICAL FIELD

The present invention relates to a liquid crystal display, more particularly relates to a liquid crystal display using reflection type display and transmission type display together.

BACKGROUND ART

Liquid crystal displays are being used as displays of a broad spectrum of electronic apparatuses making use of their characteristics of being thin in shape and low in power consumption. For example, there are laptop type personal computers, displays for car navigation, personal digital assistants (PDAs), mobile phones, digital cameras, video cameras, and other electronic apparatuses using liquid crystal displays. Such liquid crystal displays include, roughly classified, transmission type liquid crystal displays controlling the passage and blocking of light from an internal light source referred to as a backlight by a liquid crystal panel to perform the display and reflection type displays for reflecting sunlight or other external light by a reflection plate or the like to control the passage and blocking of this reflected light by the liquid crystal panel and perform the display.

In a transmission type liquid crystal display, the backlight accounts for 50 percent or more of the total power consumption, so it is difficult to reduce the power consumption. Further, a transmission type liquid crystal display also has the problem that the display looks dark where the ambient light is bright, so the viewability is lowered. On the other hand, in a reflection type liquid crystal display, a backlight is not provided, so there is no problem of an increase of the power consumption, but there is also a problem that the viewability is sharply lowered when the ambient light is low.

In order to solve such problems of both of the transmission type and reflection type display devices, a dual reflection and transmission type liquid crystal display realizing both transmission type display and reflection type display by one liquid crystal panel has been proposed. This dual reflection and transmission type liquid crystal display performs the display by the reflection of the ambient light when the surroundings are bright, while performs the display by the light of the backlight when the surroundings are dark.

In a conventional dual reflection and transmission type liquid crystal display, however, though both transmission type display and reflection type display are provided, there were the problems that the luminance was insufficient and the viewability lower than the usual reflection type and the usual transmission type liquid crystal displays. Particularly, the conventional dual reflection and transmission type liquid crystal display employed a liquid crystal panel configuration stressing reflection display, so secured a wide area for the region for reflecting the ambient light and secured reflectance by sacrificing the transmission luminance.

For example, Japanese Examined Patent Publication No. 2955277 (Patent Document 1) discloses a dual reflection and transmission type liquid crystal display. This liquid crystal display is predicated on a reflection liquid crystal display utilizing the reflected light of the ambient light and handles the sharp drop in the viewability when the ambient light is low.

However, a reflection and transmission type display device stressing the reflection type is small in appeal to people's tastes, so in the actual market, liquid crystal displays employing transmission type display as a main display system are used more often for PDAs, mobile phones, laptop type personal computers, displays for car navigation, digital cameras, video cameras, etc.

Further, Patent Document 1 mentions only color reproducibility as an item for improvement and does not describe anything about the luminance required for a liquid crystal display.

Further, Japanese Unexamined Patent Publication (Kokai) No. 2000-111902 (Patent Document 2) similarly discloses a liquid crystal display using reflection type display and transmission type display together. In this liquid crystal display, a window of a color filter for improving the luminance of the reflection portion is arranged over the entire reflection region. In the liquid crystal display according to Patent Document 2, the shape of the window is not explained, but when the reflection region is formed in a limited place, directivity of the reflected light with respect to the incident light easily occurs. Further, the minimum size of the window is not defined, therefore when transmission type display becomes the main display system, the reflection region cannot be reduced to the lowest limit.

Note that in a liquid crystal display, it is desirable to improve the viewability of the display both when used indoors and when used outdoors. For this reason, in a dual reflection and transmission type liquid crystal display, an improvement of the viewability is desirable for both of the case when it is used as the reflection type and the case when it is used as the transmission type. Particularly, as described above, in practice, most electronic apparatuses employ transmission type display as the main display system rather than reflection type display. Therefore it is desirable to improve the luminance of the transmission type display in a dual reflection and transmission type liquid crystal display.

On the other hand, along with the demands for improving the luminance of a transmission type display, it has been demanded to further increase the definition of liquid crystal displays.

For example, the liquid crystal displays used in PDAs, mobile phones, laptop type personal computers, displays for car navigation, digital cameras, video cameras, etc. have been conventionally made in the range from 100 ppi (pixel per inch) to 140 ppi. However, in order to prevent jagged edges of characters displayed and display images of the same quality as photographic images, there is a growing need for increasing the definition to 200 ppi or more.

Concerning increasing the definition to 200 ppi, due to the limits in design of liquid crystal pixels, for example the minimum width or pitch of signal lines and gate lines is not less than 5 μm, there are the disadvantages that the region which can be utilized for transmission type display for each pixel is reduced and the transmission type display luminance is reduced.

For example, by increasing the luminance of the backlight used in the transmission type, the above high definition can be realized while securing a high transmission type display luminance. As explained above, however, this means the increase of the luminance of the backlight, so the power consumption of the liquid crystal display increases. Therefore, this becomes a defect for a liquid crystal display boasting low power consumption.

DISCLOSURE OF THE INVENTION

A first object of the present invention is to provide a liquid crystal display compatible with high definition display, able to secure a luminance in transmission type display at an equivalent level as that of a display performing only transmission type display, and able to secure a required luminance in reflection type display.

A second object of the present invention is to provide a liquid crystal display compatible with high definition display, able to secure a luminance in transmission type display at an equivalent level as that of a display performing only transmission type display, and able to improve also the luminance of reflection type display.

A liquid crystal display of a first aspect of the present invention is a liquid crystal display provided with a display panel having a pixel region in which a reflection region for display by ambient light introduced from the outside and a transmission region for display by light from an internal light source are arranged in parallel, wherein a reflectance of the light in the display panel by the reflection region is 1 percent to 30 percent and a transmittance of the light in the display panel by the transmission region is 4 percent to 10 percent.

Preferably, the display panel is provided with a focus portion for focusing light incident upon the transmission region.

Preferably, the reflection region has a function of scattering the incident light or the reflection region has a function of regularly reflecting the incident light.

Preferably, the reflection region is formed by a metal film having a high reflectance.

Further, preferably, a color filter is provided in only the transmission region.

In the display panel, under conditions of irradiation of the light of the light source of 500 cd/m$^2$ to 25000 cd/m$^2$, the amount of the display light is 20 cd/m$^2$ to 200 cd/m$^2$.

In the display panel, under conditions of irradiation of the light of the ambient light of 2000 1x to 50000 1x, the amount of the display light is 200 cd/m$^2$ to 1000 cd/m$^2$.

In the pixel region, an area of the transmission region is at least 40 percent of the overall pixel region, and the area of the reflection region is 1 percent to 60 percent of the overall pixel region.

Preferably, in the pixel region, an aperture ratio of the transmission region is 40 percent to 100 percent of the overall pixel region.

A liquid crystal display of a second aspect of the present invention is a liquid crystal display provided with a display panel including a plurality of pixel regions arranged in a matrix on a substrate; a plurality of transistors formed for every pixel region and arranged in a matrix; a plurality of gate lines for connecting gate electrodes of the plurality of transistors; a plurality of data signal lines for connecting first electrodes of the plurality of transistors; storage capacitors having one-electrodes connected to the second electrodes of the transistors; storage capacitor lines for connecting another-electrodes of the storage capacitors; and a liquid crystal layer arranged between one-electrodes of the pixel regions connected to the second electrodes of the transistors and another-electrodes facing those electrodes, wherein a reflection region and a transmission region are arranged in parallel in each pixel region, a reflectance of the light in the display panel by the reflection region is 1 percent to 30 percent, and a transmittance of the light in the display panel by the transmission region is 4 percent to 10 percent.

Preferably, the display panel is provided with a focus portion for focusing the light incident upon the transmission region.

Preferably, the transistor is a thin film transistor using low temperature polycrystalline silicon as a semiconductor layer.

Preferably, the reflection region has the function of scattering the incident light, or the reflection region has the function of regularly reflecting the incident light. Further, preferably, the reflection region is formed by a metal film having a high reflectance.

Further, preferably, a color filter is provided in only the transmission region.

Further, preferably, the color filter is formed at a location corresponding to the pixel region, and an opening is formed in the reflection region of the color filter.

Preferably, the opening is formed at the approximate center of the reflection region.

Preferably, the reflection region is formed in a region just above either one of an interconnect region of a gate line, an interconnect region of a data signal line, an interconnect region of a storage capacitor line, and a formation region of the transistors or a region obtained by combining a plurality of the regions.

Further, preferably, the gate lines and the storage capacitor lines are separately formed.

Further, preferably, provision is made of a Cs-on-gate structure where the storage capacitor is connected to the gate line of a previous stage and the storage capacitor is superimposed on the gate line.

According to the above invention, a focus portion is provided in the liquid crystal display panel, the display light used for the transmission type display is focused, and the luminance of the display light is increased. Due to this, even if the area of the transmission region is reduced, the luminance of the transmission type display can be sufficiently secured, so higher definition can be handled and the transmittance can be set low. Specifically, the transmittance is set as low as 4 percent.

Further, by an absorption effect of the component layers of the display panel, the transmittance becomes 10 percent or less.

Further, a low temperature polycrystalline silicon is used, the size of a thin film transistor TFT for every pixel is reduced, and the reflection region and the reflectance are improved. Further, a reflection film made of a metal having a high reflectance is formed, or a smooth reflection film is formed, and the reflection luminance is further improved.

Further, the color filter is provided in only the transmission region, color display having a high viewability is carried out for only the transmission type display, and the reflection type display is a black and white two color display sufficient for displaying characters. Due to this, there is no longer any reduction of the light due to the absorption at the color filter in the reflection region. Further, in the case of black and white display, pixels for displaying three colors of R, G, and B are all used for the black and white display, so the reflection luminance is further improved.

Specifically, the reflectance can be set within a range from 1 percent to 30 percent.

BRIEF DESCRIPTION OF THE DRAWINGS

FIG. 12 is a view of measurement results of the reflectance where the entire surface of a reflection electrode of the display panel is a reflection film.

BEST MODE FOR WORKING THE INVENTION

Below, embodiments of the liquid crystal display of the present invention will be explained with reference to the attached drawings.

First Embodiment

Figure 1:
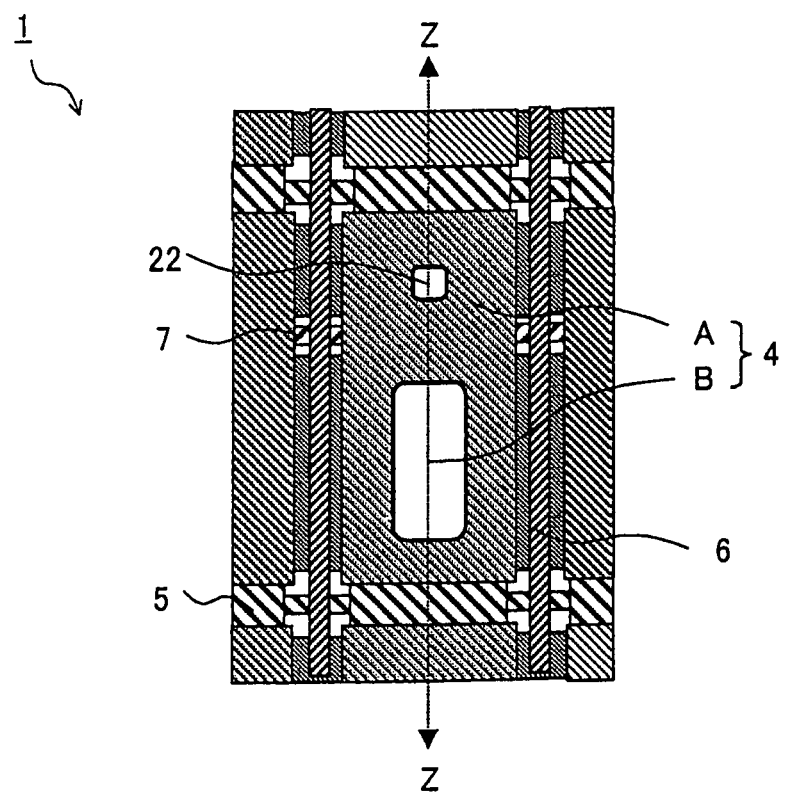
FIG. 1 is a partial plan view of a structure of a display panel of a liquid crystal display according to a first embodiment of the present invention.
Figure 2:
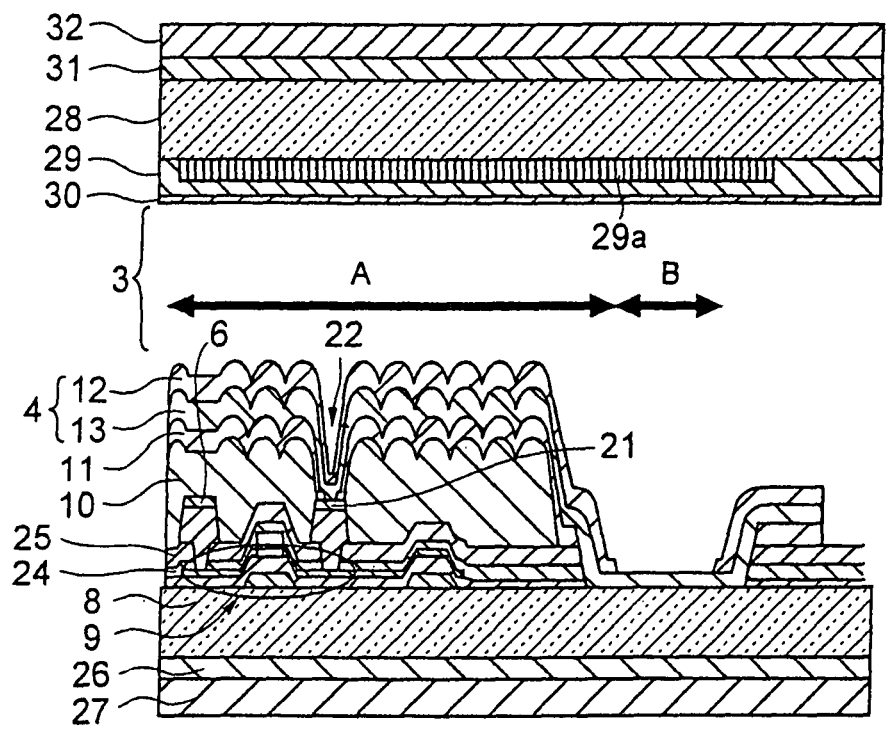
FIG. 2 is a sectional view of the structure of the display panel of the liquid crystal display according to the first embodiment of the present invention.

FIG. 1 is a plan view of one pixel's worth of a display panel 1 in the liquid crystal display of the present embodiment; and FIG. 2 shows the sectional structure of the display panel 1 along a Z-Z line in FIG. 1.

As shown in FIG. 2, the display panel 1 is constituted by a transparent insulating substrate 8 and a thin film transistor (TFT) 9 formed on that, a pixel region 4, etc., a transparent insulating substrate 28 arranged facing them and an overcoat layer 29 formed on that, a color filter 29a, and an counter electrode 30 and a liquid crystal layer 3 sandwiched between the pixel region 4 and the counter electrode 30.

The pixel regions 4 shown in FIG. 1 are arranged in a matrix. A gate line 5 for supplying a scan signal to the TFT 9 shown in FIG. 2 and a signal line 6 for supplying a display signal to the TFT 9 are provided around each pixel region 4 perpendicular to each other, whereby a pixel portion is constituted.

Further, on the transparent insulating substrate 8 and the TFT 9 side, a storage capacitor use interconnect (hereinafter referred to as a "CS line") 7 made of a metal film parallel to the gate line 5 is provided. The CS line 7 forms a storage capacitor CS with a connection electrode 21 explained later and is connected to the counter electrode 30.

Figure 3:
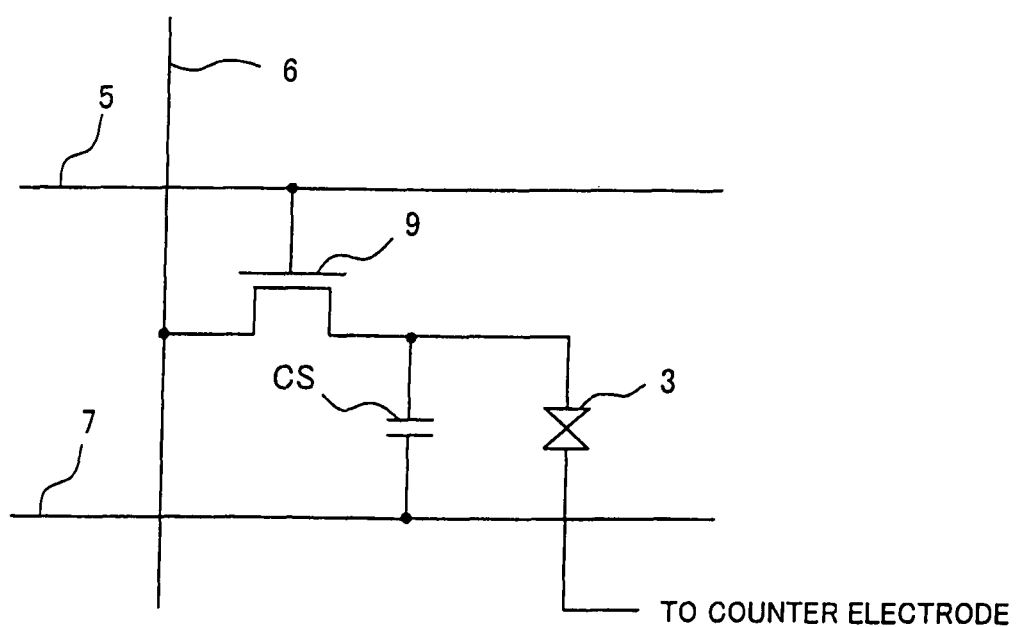
FIG. 3 is an equivalent circuit diagram of a pixel region.

FIG. 3 shows an equivalent circuit of the pixel region 4 including the liquid crystal 3, TFT 9, gate line 5, signal line 6, CS line 7, and storage capacitor CS.

Further, as shown in FIG. 2, the pixel region 4 is provided with a reflection region A for reflection type display and a transmission region B for transmission type display.

The transparent insulating substrate 8 is formed by a transparent material such as glass. The transparent insulating substrate 8 is formed with the TFT 9, a scattering layer 10 formed on the TFT 9 via an insulating film, a flattening layer 11 formed on this scattering layer 10, a transparent electrode 13, and a reflection electrode 12 constituting the pixel region 4 having the reflection region A and the transmission region B explained above.

Figure 4:
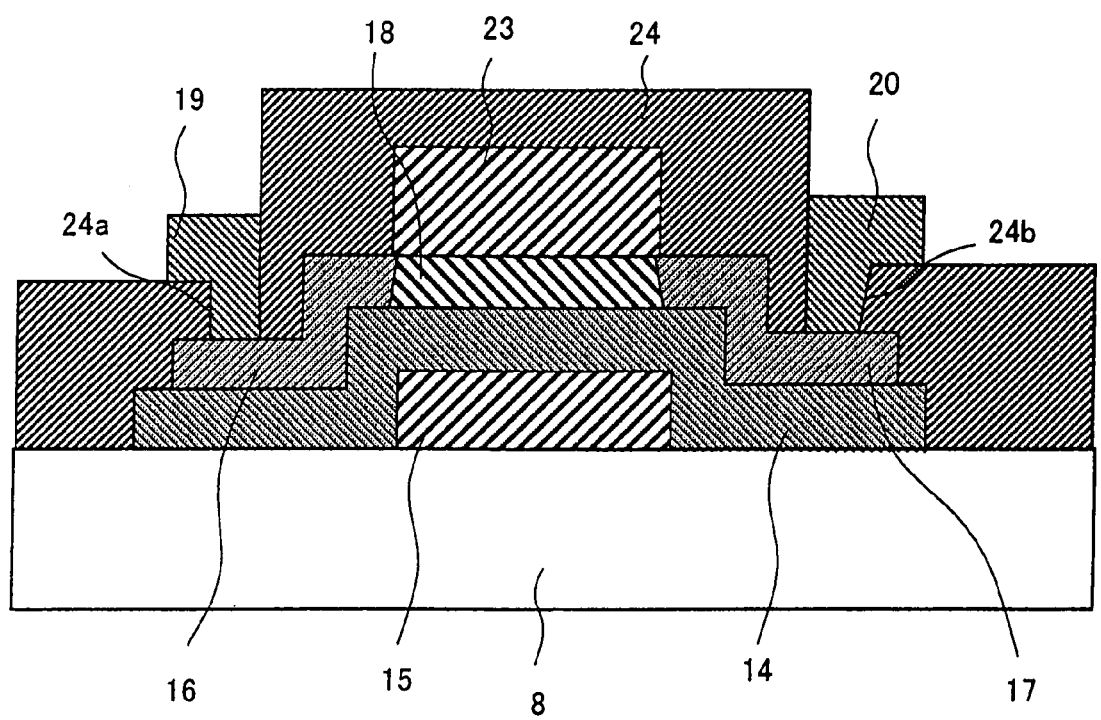
FIG. 4 is a sectional view of an example of the structure of a thin film transistor in the liquid crystal display according to the first embodiment of the present invention.

The TFT 9 is a switching element for selecting a pixel to be displayed and supplying a display signal to the pixel region 4 of the pixel. As shown in FIG. 4, the TFT 9 has for example a so-called bottom gate structure. A gate electrode 15 covered by a gate insulating film 14 is formed on the transparent insulating substrate 8. The gate electrode 15 is connected to the gate line 5, the scan signal is input from this gate line 5, and the TFT 9 turns ON/OFF in accordance with this scan signal. The gate electrode 15 is formed by forming a film of molybdenum (Mo), tantalum (Ta), or another metal or alloy by a method such as sputtering.

In the TFT 9, a pair of $n^+$ diffusion layers 16 and 17 and a semiconductor film 18 are formed on the gate insulating film 14. One $n^+$ diffusion layer 16 is connected to a source electrode 19 via a contact hole 24a formed in a first inter-layer insulating film 24, while the other $n^+$ diffusion layer 17 is connected to a drain electrode 20 similarly via a contact hole 24b formed in the first inter-layer insulating film 24.

The source electrode 19 and the drain electrode 20 are obtained by patterning for example aluminum (Al). The source electrode 19 is connected to the signal line 6 and receives as input the data signal. The drain electrode 20 is connected to a connection electrode 21 shown in FIG. 2 and further is electrically connected with the pixel region 4 via the contact hole 22. The connection electrode 21 forms the storage capacitor CS with the CS line 7 via the gate insulating film 14. The semiconductor thin film layer 18 is a thin film of the low temperature polycrystalline silicon (poly-Si) obtained by for example CVD and is formed at a location matching with the gate electrode 15 via the gate insulating film 14.

A stopper 23 is provided just above the semiconductor thin film layer 15. The stopper 23 protects the semiconductor thin film layer 18 formed at the location matching with the gate electrode 19 from an upper side.

In the TFT 9, as explained above, when the semiconductor thin film layer 18 is formed by low temperature polycrystalline silicon, the electron mobility is larger in comparison with a case where the semiconductor thin film layer 18 is formed by amorphous silicon (a-Si), so the outer diameter size can be made smaller.

Figure 5:
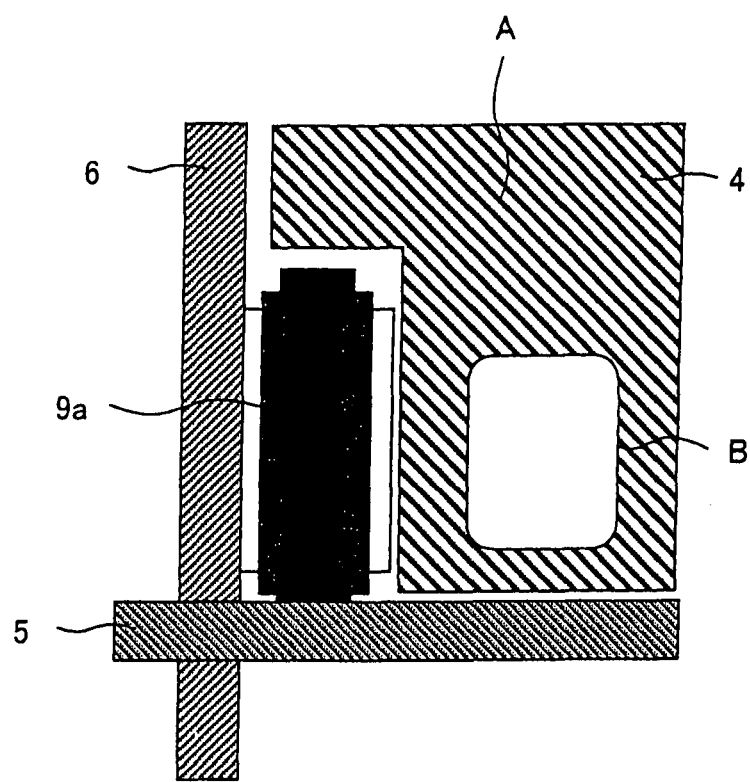
FIG. 5 is a plan view of an example of a layout of pixels in the liquid crystal display according to the first embodiment of the present invention.
Figure 6:
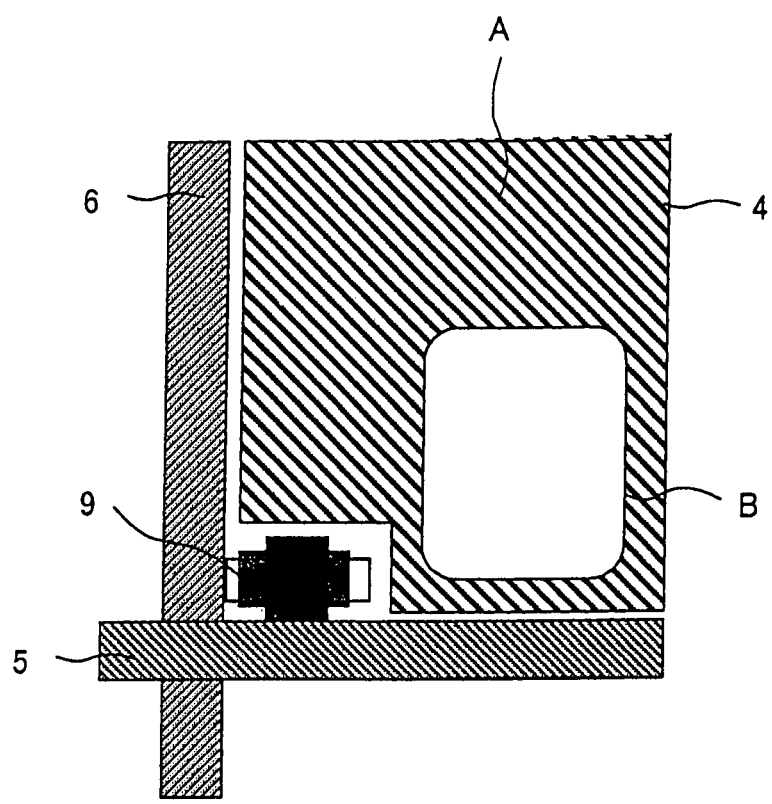
FIG. 6 is a plan view of another example of the layout of pixels in the liquid crystal display according to the first embodiment of the present invention.

FIG. 5 and FIG. 6 are views diagrammatically showing the sizes of TFTs forming the semiconductor thin film layers 18 by a-Si and low temperature poly-Si.

As shown in FIG. 5 and FIG. 6, in a liquid crystal display using a TFT 9 forming the semiconductor thin film layer 18 by low temperature poly-Si, a large area of the pixel region 4 constituted by the reflection region A and the transmission region B can be secured. When the area of the reflection region A is approximately equal to that of the conventional-display device, the area of the transmission region B can be increased and the transmittance of the entire display panel can be improved.

Figure 7:
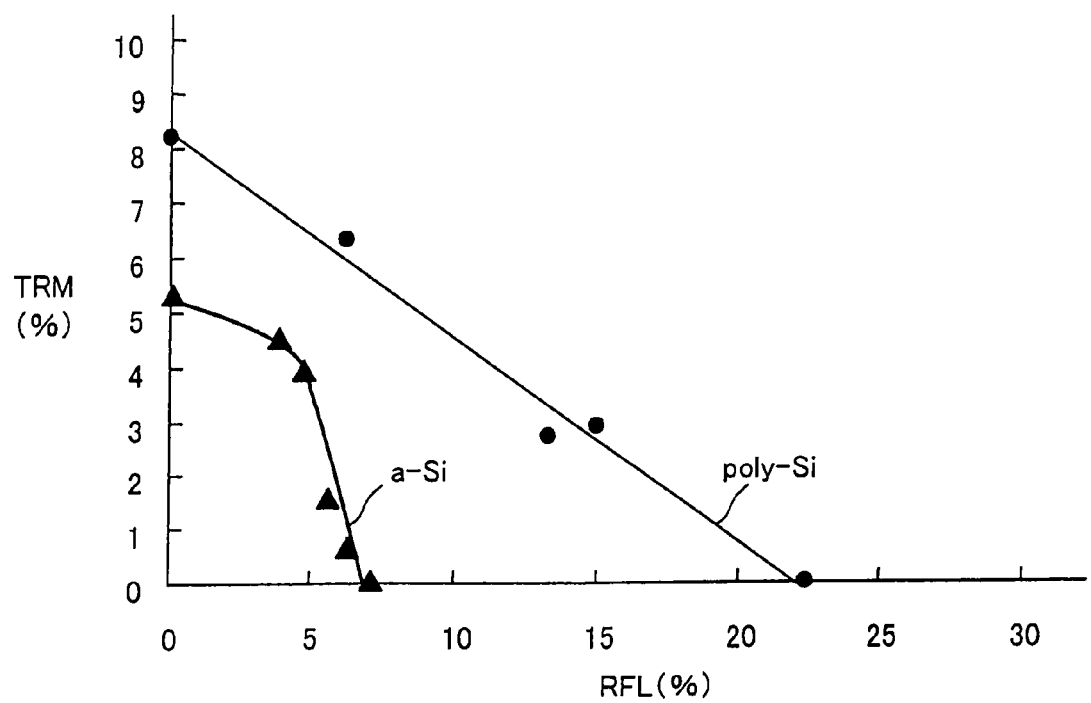
FIG. 7 shows measurement data of reflectance and transmittance of liquid crystal displays using TFTs formed by Poly-Si and TFTs formed by a-Si.

FIG. 7 is a view of a difference of the reflectance and the transmittance in dual reflection and transmission type liquid crystal displays using TFTs 9 forming the semiconductor thin film layers 18 by a-Si and low temperature poly-Si. In FIG. 7, the abscissa indicates the reflectance RFL, and the ordinate indicates the transmittance TRM.

The measurement values of the reflectance and the transmittance shown in FIG. 7 were obtained by changing the area of the opening acting as the transmission region B in FIG. 5 and FIG. 6. In the above measurement, the pixel region 4 has a silver reflection film, and the pixel size is 126 μm×42 μm.

As shown in FIG. 7, by applying low temperature poly-Si for the TFT 9, the reflectance of the liquid crystal display reaches about 25 percent at the maximum, and a transmittance of 8 percent at the maximum is obtained. On the other hand, when a-Si is used, the maximum reflectance is about 7 percent, and the maximum transmittance is about 5 percent.

The scattering layer 10 and the flattening layer 11 are formed on the TFT 9 via the first and second inter-layer insulating films 24 and 25. The first inter-layer insulating film 24 is formed with a pair of contact holes 24a and 24b for forming a source electrode 19 and a drain electrode 20.

The reflection electrode 12 is made of a metal film of rhodium, titanium, chromium, silver, aluminum and Chromel. The reflection region of the reflection electrode 12 is formed with relief shapes and is configured to diffuse and reflect the external light. Due to this, the directivity of the reflection light is eased and the screen can be viewed from a wide range of angles.

Particularly, when using silver (Ag) or the like, the reflectance in the reflection type display becomes high, and a reflection region A of a high reflectance can be obtained. For this reason, even if the area of the reflection region A is made small, the reflectance of the required level can be secured. Such a liquid crystal display reducing the reflection region will be referred to as a "micro reflection liquid crystal display".

Further, the transparent electrode 13 is made of a transparent conductive film such as ITO.

These reflection electrode 12 and transparent electrode 13 are electrically connected to the TFT 9 via the contact hole 22.

The opposite surface of the transparent insulating substrate 8, that is, the surface where a not illustrated backlight serving as an internal light source is arranged, is provided with a ¼ wavelength plate 26 and a polarization plate 27.

Facing the transparent insulating substrate 8 and the components formed thereon, a transparent insulating substrate 28 formed by using a transparent material such as glass is arranged. The surface of the transparent insulating substrate 28 on the liquid crystal layer 3 side is formed with a color filter 29a and an overcoat layer 29 for flattening the surface of the color filter 29a. The surface of the overcoat layer 29 is formed with a counter electrode 30. The color filter 29a is a resin layer colored by a pigment or a dye and is configured by combining filter layers of for example red, green, and blue colors. The counter electrode 30 is made of a transparent conductive film such as ITO.

The opposite surface of the transparent insulating substrate 28 is provided with a ¼ wavelength plate 31 and a polarization plate 32.

The liquid crystal layer 3 sandwiched between the pixel region 4 and the counter electrode 30 is obtained by sealing a guest host liquid crystal mainly including nematic liquid crystal molecules having a negative dielectric anisotropy and containing a dichromatic dye in a predetermined ratio. It is vertically oriented by a not illustrated orientation layer. In this liquid crystal layer 3, in a no-voltage state, the guest host liquid crystal is vertically oriented, while in a voltage application state, it shift to a horizontal orientation.

Figure 8:
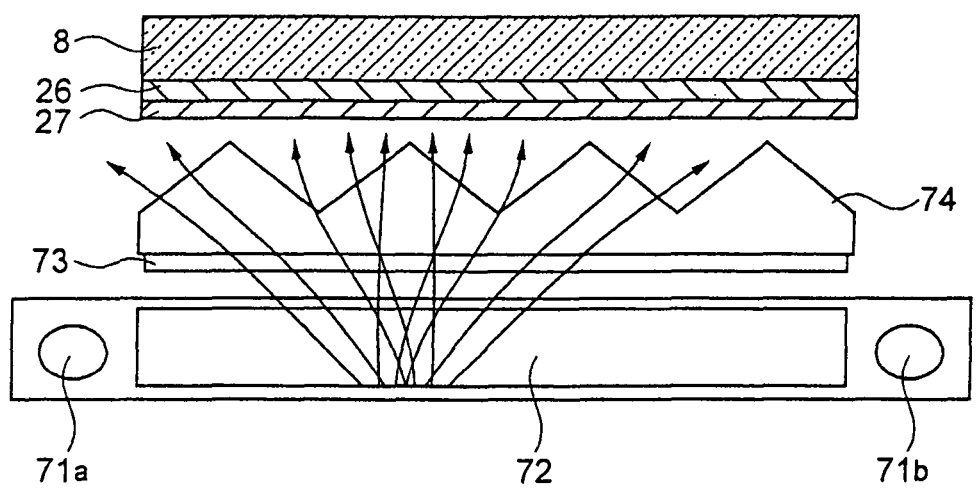
FIG. 8 is a view of a backlight and a focus optical system thereof in the liquid crystal display according to the first embodiment of the present invention.

FIG. 8 shows a backlight and a focus optical system thereof in the liquid crystal display according to the present embodiment.

In FIG. 8, 71a and 71b indicate backlights, 72 a light guide plate, 73 a diffusion plate, and 74 a lens sheet.

The backlights 71a and 71b are constituted by for example cold cathode fluorescent tubes. The light guide plate 72 guides light of the backlights 71a and 71b to the display panel 1. The diffusion plate 73 forms a relief surface. Due to this, the light of the backlights 71a and 71b is uniformly irradiated to the display panel 1. The lens sheet 74 focuses the light diffused by the diffusion plate 73 to the center of the display panel 1. The light focused to the lens sheet 74 passes through the transmission region B via the polarization plate 27, the ¼ wavelength plate 26, and the transparent substrate 8.

Figure 9:
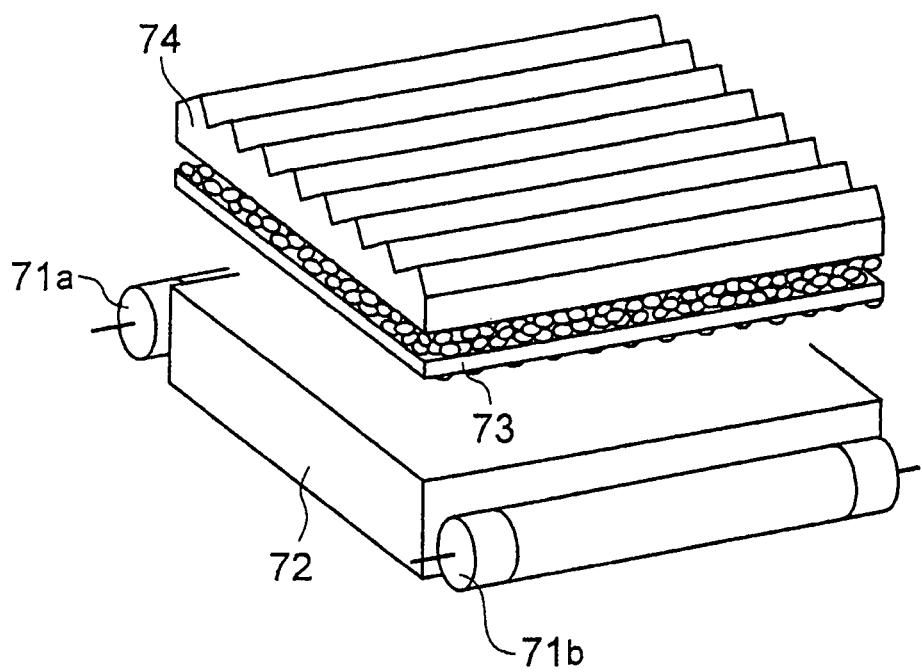
FIG. 9 is a perspective view of the backlight and the focus optical system thereof shown in FIG. 8.

FIG. 9 is a perspective view of the backlight and the focus optical system thereof shown in FIG. 8.

The lens sheet 74 has a focus function, so loss due to scattering of the light diffused by the diffusion plate 73 is suppressed, and the luminance of the illumination light is raised.

As explained above, conventionally, a liquid crystal display has been prepared with a definition within a range from 100 ppi to 140 ppi. Since the definition was low, the aperture ratio of the transmission region B could be relatively largely formed. Specifically, at least 50 percent could be secured as the aperture ratio when designed for 140 ppi. Due to this, the conventional transmittance became 5 percent.

Note that the transmittance in a liquid crystal display is generally regarded as one-tenth of the aperture ratio of the transmission region B. The aperture ratio of the transmission region B is defined as the ratio of the transmission region B with respect to the area of the entire pixel region 4.

The transmittance was set at one-tenth of the aperture ratio of the transmission region B because the light from the backlights is absorbed and reflected by the transparent insulating substrates 8 and 28, the first and second inter-layer insulating films 24 and 25 formed on the TFT 9, the liquid crystal layer 3, the polarization plates 27 and 32, and the ¼ wavelength plates 26 and 31 constituting the display panel 1.

Concerning an increase in definition to 200 ppi, for example, the pixel size becomes a small 126 µm×42 µm. Further, due to restrictions in the design of the liquid crystal pixel, for example, the minimum width or pitch of the signal lines and the gate lines being not less than 5 µm, the area of the transmission region B becomes small. Specifically, the aperture ratio becomes 40 percent at the lowest.

The ratio of the area of the reflection region A with respect to the area of the entire pixel region 4, that is, the aperture ratio of the reflection region A, becomes 60 percent or less when the reflection region A occupies the pixel region 4 other than the transmission region B. The aperture ratio of the reflection region A cannot be reduced to 0 percent. From this, the aperture ratio of the reflection region A the least required for a dual reflection and transmission type liquid crystal display is determined within a range from 1 percent to 60 percent.

In order to deal with the increase in definition while securing the luminance of the transmission type display, for example, the luminance of the backlights 71a and 71b can be increased by 25 percent, but the power consumption of the liquid crystal display increases.

Therefore, when the lens sheet 74 explained above is used, it becomes possible to deal with the increase in definition without increasing the power consumption of the backlights 71a and 71b. Specifically, the luminance of the backlights 71a and 71b can be raised to 500 cd/m$^2$ to 25000 cd/m$^2$ from the usual range from 400 cd/m$^2$ to 20000 cd/m$^2$.

Accordingly, in the present embodiment, in the case of a liquid crystal display having a high definition of 150 ppi or more, a micro reflection structure liquid crystal display can set the transmittance at to as low as 4 percent in order to secure the transmission luminance.

On the other hand, in order to deal with the increase in definition and not increase the luminance of the backlights 71a and 71b, the best choice is to set the transmittance to the minimum 4 percent. The reason for this will be explained below.

In order to perform a display by liquid crystals, the surface luminance of the display panel 1 must be set within a certain range.

Figure 10:
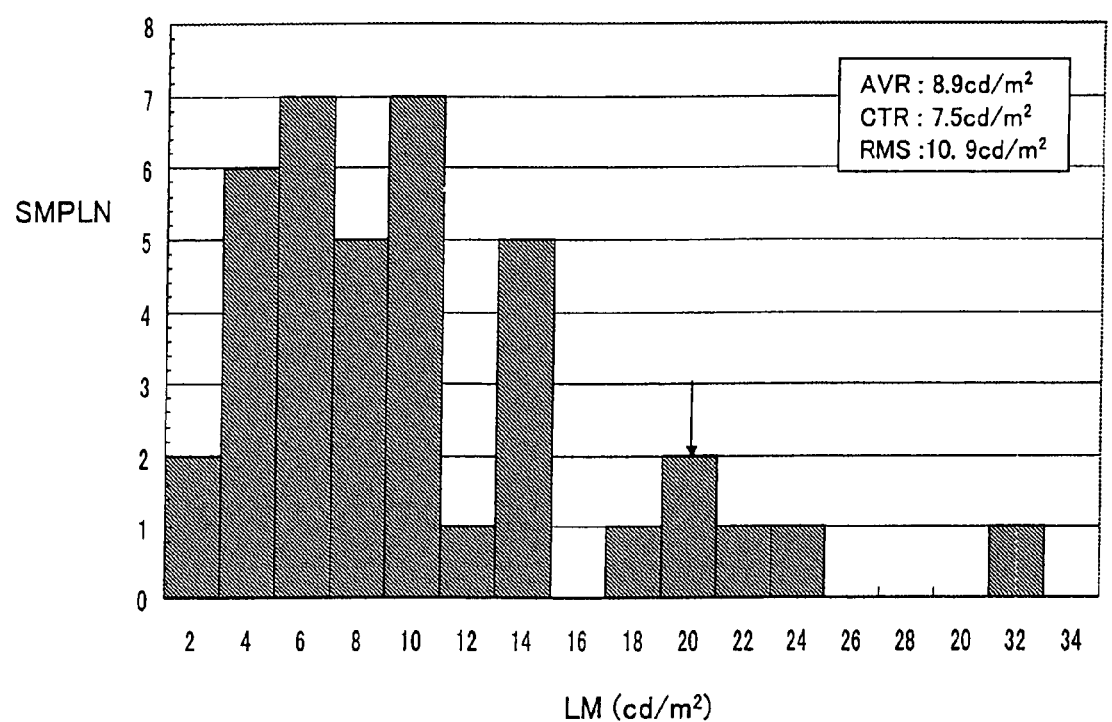
FIG. 10 is a view of results of investigation of the lowest display luminance required for the display panel in the liquid crystal display according to the first embodiment of the present invention.

FIG. 10 is a view of the results of investigation showing the minimum luminance required for the display panel surface and shows the results of investigation of the number of people able to recognize the character display when the display luminance changes within a range from 2 to 34 cd/m$^2$. In FIG. 10, the abscissa indicates the luminance LM, and the ordinate indicates a sample number SMPLN. Note that, in this case, as shown in FIG. 10, an average value (AVR) is 8.9 cd/m$^2$, the center value (CTR) is 7.5 cd/m$^2$, and the RMS is 10.9 cd/m$^2$.

According to FIG. 10, if the surface luminance is 20 cd/m$^2$ or more, 90 percent or more of people can recognize the character display. Further, the fact that, if it is not more than 1000 cd/m$^2$, people can discriminate the characters has been known.

Accordingly, when performing a display by liquid crystals, the surface luminance of the display panel 1 must be maintained at 20 cd/m$^2$ to 1000 cd/m$^2$.

Figure 11:
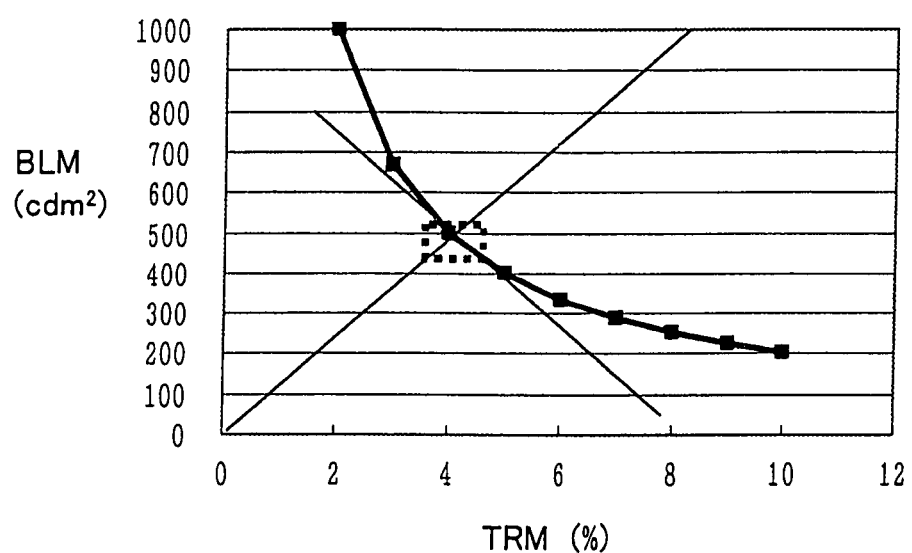
FIG. 11 is a graph of the relationship of transmittance and backlight luminance when a constant luminance is maintained on the surface of the display panel in the liquid crystal display according to the first embodiment of the present invention.

When the surface luminance of the display panel 1 is maintained at 20 cd/m$^2$, this means that a product of the transmittance of the display panel 1 and the luminance of the backlight is 20 cd/m$^2$. Accordingly, the relationship between the transmittance and the luminance of the backlights can be expressed by an inverse proportional function as Shown in FIG. 11. In FIG. 11, the abscissa indicates the transmittance TRM, and the ordinate indicates the luminance BLM of the backlights.

In order to keep the transmittance and the luminance of the backlights to the minimum as much as possible, the location where a tangential normal of a curve as shown in FIG. 11 intersects an origin of a coordinate system becomes the most desirable condition. Here, the transmittance is 4 percent. Namely, 4 percent becomes the value of the optimum transmittance in order to deal with an increase in definition.

The reason why the transmittance becomes 10 percent at most is that the light from the backlights is absorbed and reflected by the transparent insulating substrates 8 and 28, the first and second inter-layer insulating films 24 and 25 formed on the TFT 9, the liquid crystal layer 3, the polarization plates 27 and 32, and the ¼ wavelength plates 26 and 31 constituting the display panel 1.

In the display panel 1, the polarization plates 27 and 32 are 50 percent polarization plates. The transmittance of each is 50 percent. The sum of the transmittances of the remaining parts, that is, the transparent insulating substrates 8 and 28, the first and second inter-layer insulating films 24 and 25 formed on the TFT 9, and the ¼ wavelength plates 26 and 31, is deemed to be 40 percent. Even if considering that all pixels can be passed through, the maximum transmittance of the display panel 1 becomes 50 percent (polarization plate)×50 percent (polarization plate)×40 percent (glass+TFT)=10 percent.

Accordingly, in the present embodiment, the range of the transmittance becomes 4 percent to 10 percent.

Concerning the reflectance, it is known that the illuminance observed outdoors becomes 2000 cd/m$^2$ on very dark days (with overcast thunderclouds and snow) and becomes 50000 1x (cd/m$^2$) in clear state. Further, in the same way as that described above, in order for people to discriminate the character display, the display luminance must be 20 cd/m$^2$ or more. Accordingly, the reflectance of the display panel becomes 1 percent. The definition and measurement method of the reflectance will be explained later. This result coincides with the result of investigations by the inventors of the present application on the lowest illuminance by emitting light to a PDA from the front surface in a dark room.

Regarding the maximum reflectance, it is known from measurement that 42 percent is the limit as the reflectance when for example Ag covers the entire surface of the reflection electrode 12. The graph shown in FIG. 12 shows the results of measurement of the reflectance when the entire surface of the reflection electrode 12 is used as the reflection surface. In FIG. 12, PNLN indicates the display panel number, and RFL indicates the reflectance. The average value of the measurement data shown in FIG. 12 is 42.23 percent. Accordingly, the display panel according to the present embodiment has an average reflectance of about 42 percent when the entire surface of the reflection electrode 12 is used as the reflection surface.

In actuality, the transmittance is 4 percent or more, that is, the aperture ratio is 40 percent to 100 percent. Namely, the area ratio of the reflection region is 60 percent or less. This being so, the maximum reflectance of the display panel 1 becomes 60 percent (reflectance)×42 percent (total surface reflectance)=25 percent. The reason for the aperture ratio being less than 100 percent is as follows. Namely, the signal line, gate line, and the transistor portions inside the pixel unavoidably block the transmission region. Therefore 100 percent cannot achieved as the aperture ratio, and it becomes less than 100 percent.

Figure 13:
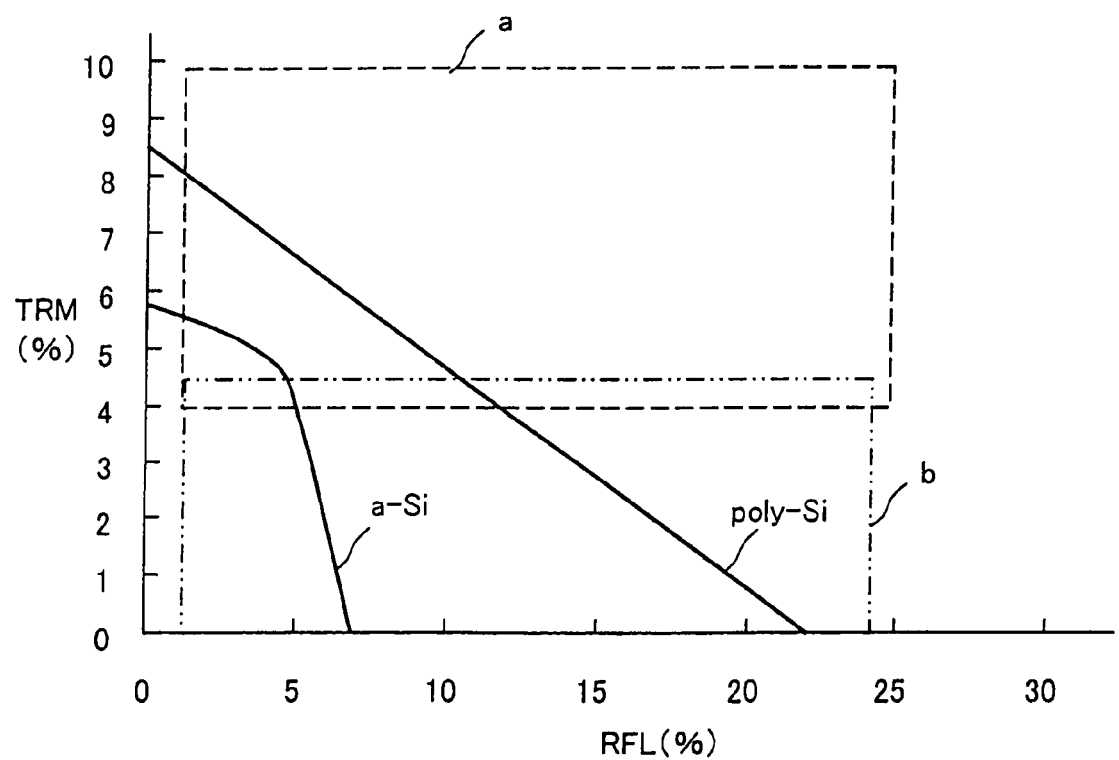
FIG. 13 is a view of a range of the transmittance and the reflectance able to be set in the liquid crystal display according to the first embodiment of the present invention.

FIG. 13 is a view of a range of transmittance and reflectance able to be set in the liquid crystal display according to the first embodiment. In FIG. 13, the abscissa indicates the reflectance RFL, and the ordinate indicates the transmittance TRM. Further, in FIG. 13, a region indicated by the letter "a" indicates the range of transmittance and reflectance able to be set in a liquid crystal display according to the present embodiment, and a region indicated by the letter "b" indicates the range of transmittance and reflectance able to be set in a conventional liquid crystal display.

By the above liquid crystal display of the present embodiment, the reflectance in the display panel 1 can be set in a range from 1 percent to 25 percent, and the transmittance can be set at 4 percent to 10 percent, that is in the range of the region "a" shown in FIG. 13. By this, the liquid crystal display of the present embodiment can secure a luminance of the display light equivalent to that of a liquid crystal display performing only transmission type display even with the luminance of a conventional backlight, can secure the characteristics of a reflection type even in a high definition display of for example 200 ppi, and can realize a display having a high viewability even when the sunlight, illumination light, or other external light is dim.

Contrary to this, in a conventional liquid crystal display, the reflectance and the transmittance were set in the range of the region "b" shown in FIG. 13. Therefore, although a reflectance near that of the present embodiment can be secured, the transmittance is low, the luminance of the display light in the transmission type display is not sufficient, and the viewability is lowered.

Next, the method of measurement of the reflectance of the liquid crystal display explained above will be explained.

Figure 14A:
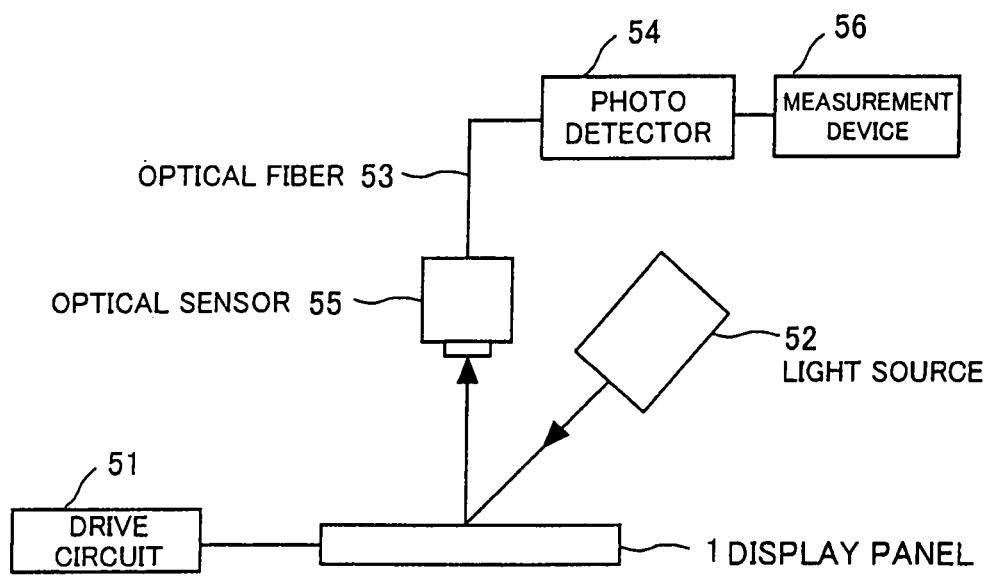
FIG. 14A and FIG. 14B are views explaining a method for measuring the reflectance.

As shown in FIG. 14A, light is emitted from an external light source 52 to the liquid crystal display panel 1 having the above constitution. A drive circuit 51 supplies a suitable drive voltage to the display panel 1 to drive the display panel 1 so as to display white on the display panel 1. Then, the incident light is reflected at the reflection film in the display panel 1, is emitted, and strikes an optical sensor 55. An optical fiber 53 transmits the light received by the optical sensor 55 via the optical fiber 53 to a photo detector 54 and a measurement device 56. The measurement device 56 measures the output in the white display of the reflection light.

Figure 14B:
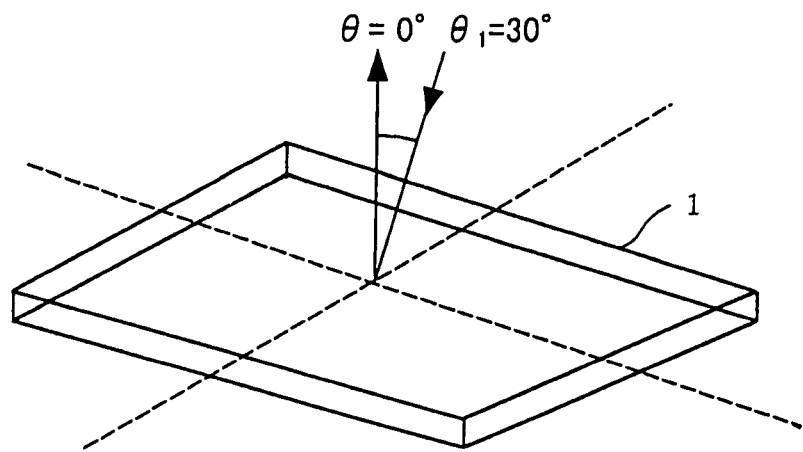

At this time, the light emitted from the external light source 52, as shown in FIG. 14B is emitted so that an incident angle $\theta_1$ becomes 30° at the center of the display panel 1 and so that the reflection light reflected at the display panel 1 strikes the optical sensor 55 from the front surface, that is, the incident angle upon the optical sensor 55 becomes 0°. The reflectance of the reflection region A is found as shown in the following equation 1 using the output of the reflection light obtained in this way:

$$R=R(\text{White})=(\text{output from white display/output from reflection standard})\times\text{reflectance of reflection standard} \quad (1)$$

Here, the "reflection standard" is a standard reflection object whose reflectance is already known. When the incident light is constant, if comparing the amount of the reflection light from the measurement object with the amount of the reflection light from the reflection standard, the reflectance of the measurement object can be estimated.

Figure 15:
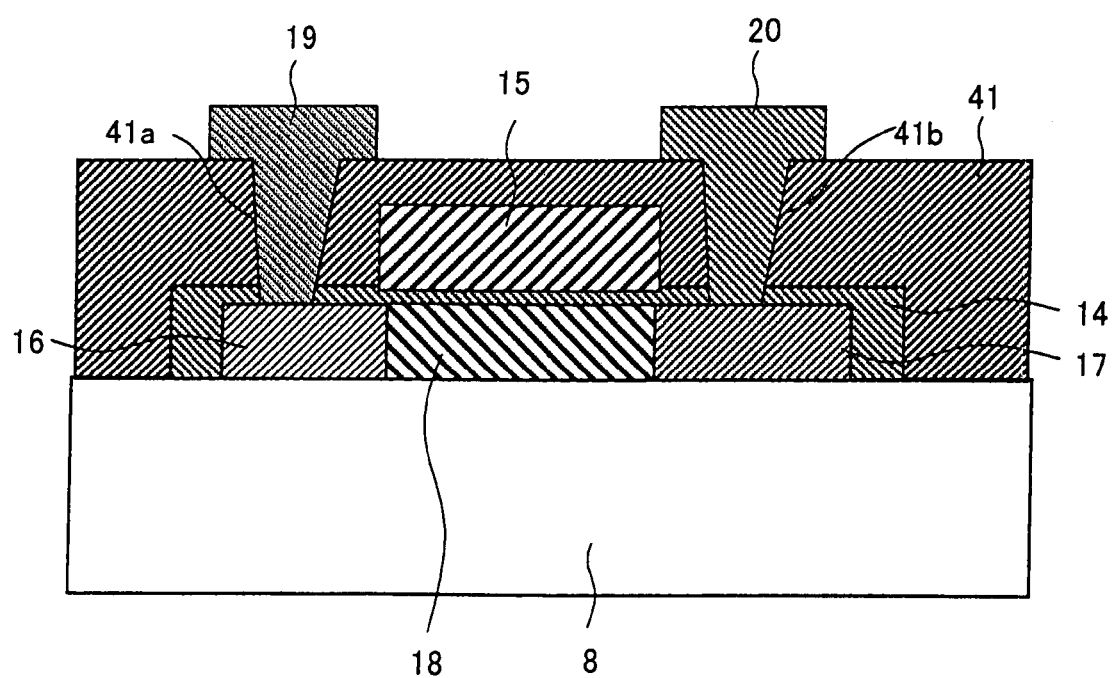
FIG. 15 is a sectional view of another example of the structure of a thin film transistor in the liquid crystal display according to the first embodiment of the present invention.

Note that the above explanation was given assuming that the TFT 9 had a bottom gate structure, but the TFT 9 is not limited to such a structure and may have a so-called top gate structure shown in FIG. 15. In FIG. 15, the same notations are used for components similar to those of the TFT 9 shown in FIG. 4, and explanations thereof are omitted.

In a TFT 40, a transparent insulating substrate 8 is formed with a pair of $n^+$ diffusion layers 16 and 17 and a semiconductor thin film layer 18. These are covered by a gate insulating film 14. The gate insulating film 14 is formed with a gate electrode 15 at a location matching with the semiconductor thin film layer 18 and is covered by an inter-layer insulating film 41. The inter-layer insulating film 41 is formed with a source electrode 19 and a drain electrode 20, the source electrode 19 is connected to one $n^+$ diffusion layer 16 via a contact hole 41a formed in the inter-layer insulating film 41, and the drain electrode 20 is connected to the $n^+$ diffusion layer 17 via a contact hole 41b formed in the inter-layer-insulating film 41.

According to the present embodiment, by focusing the light from the backlights by the lens sheet 74, the luminance of the backlights is improved, the transmittance is set at 4 percent to 10 percent, the reflectance is set in a range from 1 percent to 25 percent, and it becomes possible to deal with the reduction of the pixel size and the transmission region area along with the increased definition of display while securing a display light luminance equivalent to that of a display performing only transmission type display and a reflection display light luminance required for the display without increasing the power consumption of the backlights.

Second Embodiment

Next, an explanation will be given of a second embodiment of the present invention in relation to FIG. 16 to FIG. 18.

The liquid crystal display of the present embodiment has a basic structure the same as that of the liquid crystal display explained in the first embodiment. Note, in the liquid crystal display of the present embodiment, the configuration of the color filter is different from that of the first embodiment.

Figure 16:
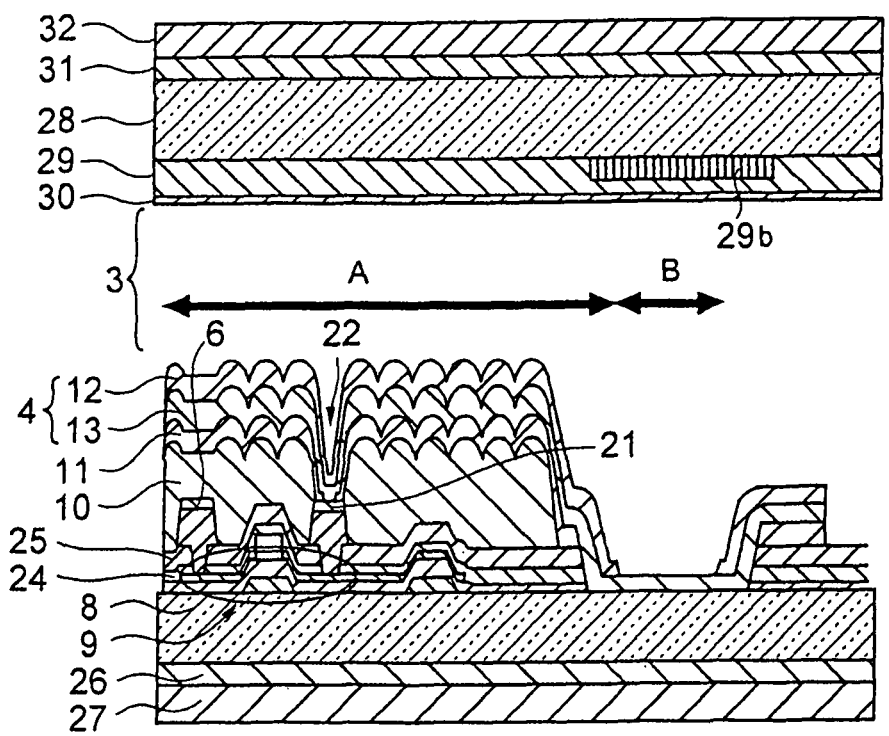
FIG. 16 is a sectional view of the structure of the display panel of a liquid crystal display according to a second embodiment of the present invention.

FIG. 16 is a sectional view of the structure of a display panel 81 in the liquid crystal display of the present embodiment. The plan view of the display panel 81 shown in FIG. 16 is similar to that of FIG. 1. FIG. 16 is a sectional view at the center of this plan view.

Note that, in FIG. 16, the same notations are used for components similar to those of the liquid crystal display of the first embodiment, and overlapping explanations are omitted.

The structure of the display panel 81 shown in FIG. 16 is basically the same as that of the display panel 1 shown in FIG. 2. Note, in FIG. 16, the color filter 29b is provided in only the transmission region B.

Namely, in the display panel 81 shown in FIG. 16, the thin film transistor TFT 9 is formed by using a thin film of low temperature polycrystalline silicon (poly-Si) obtained by for example CVD, the outer diameter size can be reduced, the areas of the reflection region A and the transmission region B can be made large, and both of the reflectance and the transmittance can be improved.

Further, the reflection electrode 12 is made of a rhodium, titanium, chromium, silver, aluminum, Chromel, or other metal film, the surface of the reflection region A is formed with relief shapes, and the directivity of the reflection light is eased. Particularly, when using silver (Ag) or the like, the reflectance in the reflection type display becomes high. Even if the area of the reflection region A is made small, the reflectance of the required level can be secured.

The color filter 29b is a resin layer colored by a pigment or a dye and is configured by combining filter layers of for example red, green, and blue colors.

Conventionally, in order to perform color display, the color filter is provided at a location matching with the entire pixel region 4 of the transparent insulating substrate 28, and both of the reflection type display and the transmission type display become color display. The color filter absorbs light, so the luminance of the reflection light and the transmission light is reduced by that amount.

In a liquid crystal display mainly using transmission type display, the time of using the reflection type display is short. For example, when a power supply can be secured, only the transmission type display is used, while when a power supply cannot be secured and there is a certain degree of ambient light, the reflection type display is used.

At such a time, it is sufficient that only the characters are displayed by two colors of white and black and that a difference between the white and the black required for displaying e-mail or other text or tables etc. be clear.

Accordingly, in the present embodiment, as shown in FIG. 16, the color filter 29b does not cover the entire surface of the pixel region 4, but only the transmission region B.

Due to this, in the reflection region A, no color filter is provided, so the absorption of light and the reduction of the luminance due to the color filter are eliminated.

Further, in contrast to the display of one dot on the screen by three pixels of R, G, and B in the case of the color display, in the case of a black and white display, one pixel displays one dot and the number of displayed pixels becomes substantially three times that of the color display, so the reflection luminance becomes further higher.

Figure 17:
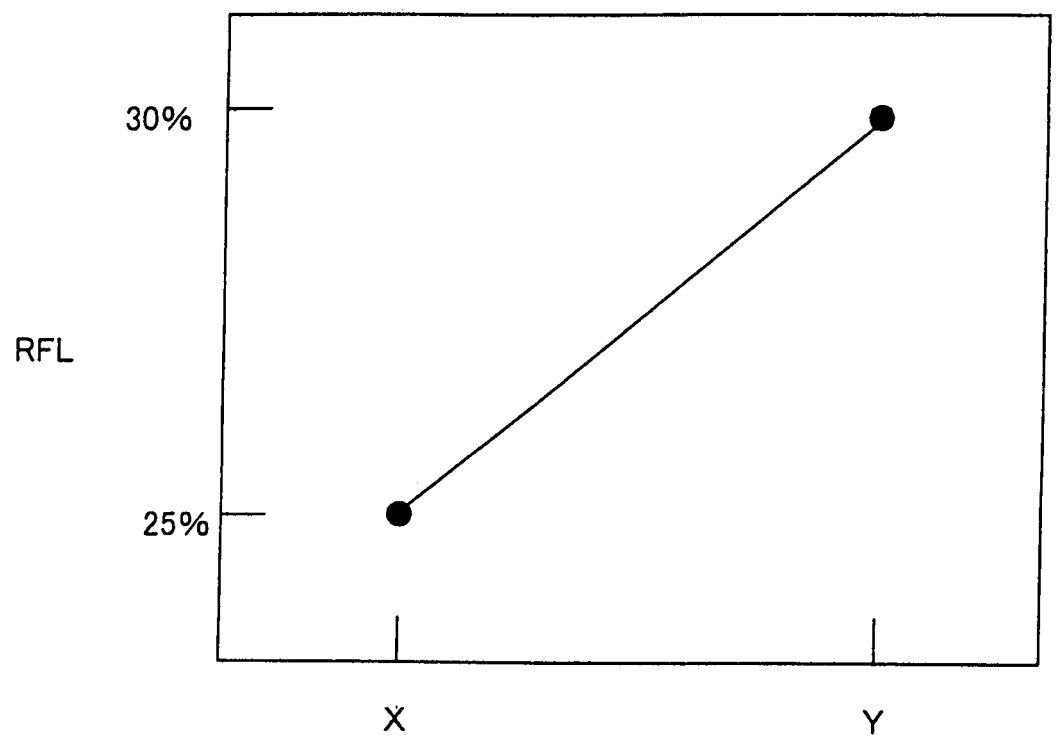
FIG. 17 is a view of an increase of the maximum reflectance in the liquid crystal display according to the second embodiment of the present invention.

FIG. 17 shows data of the reflectance (X) where the color filter is provided in both of the reflection region A and the transmission region B and the reflectance (Y) obtained by the present embodiment. In FIG. 17, the ordinate indicates the reflectance RFL. By arranging the color filter 29b as in the present embodiment, the reflectance further greatly increases and reaches 30 percent.

Figure 18:
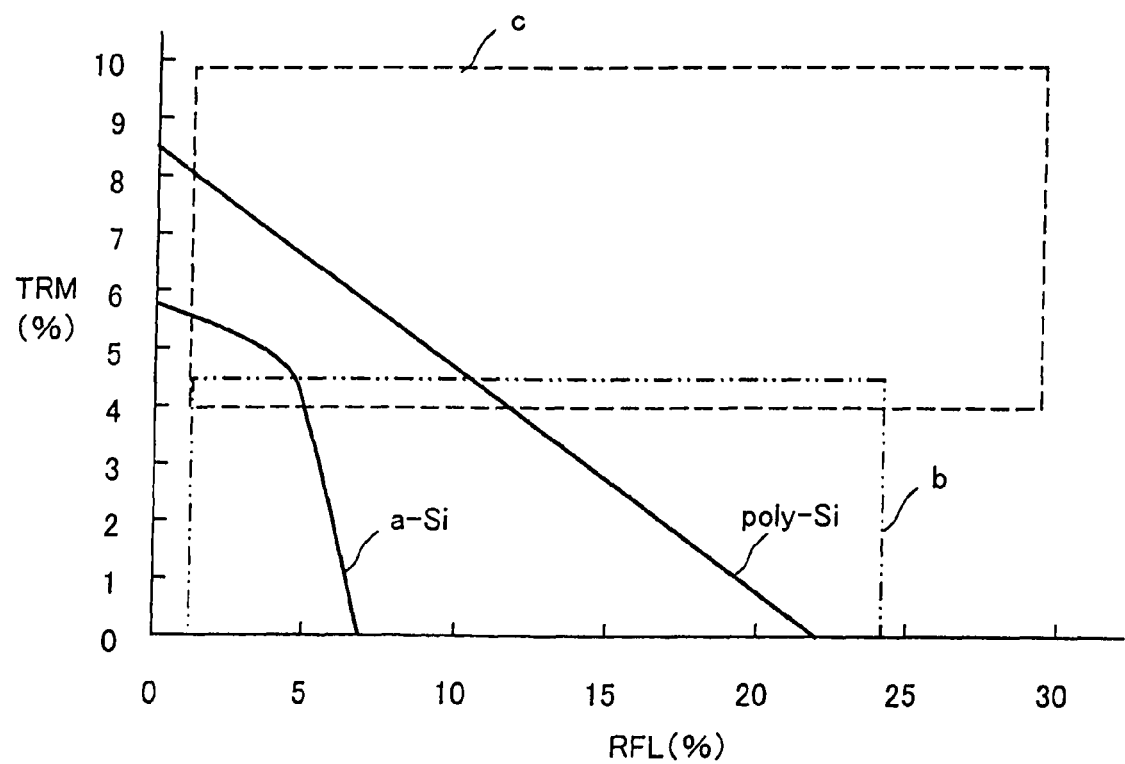
FIG. 18 is a view of a range of transmittance and reflectance able to be set in the liquid crystal display according to the second embodiment of the present invention.

FIG. 18 is a view of a range of transmittance and reflectance able to be set in the liquid crystal display according to the first embodiment. In FIG. 18, the abscissa indicates the reflectance RFL, and the ordinate indicates the transmittance TRM. Further, in FIG. 18, a region indicated by the letter "c" indicates the range of transmittance and reflectance able to be set in the liquid crystal display according to the present embodiment, and the region indicated by the letter "b" indicates the range of transmittance and reflectance able to be set in a conventional liquid crystal display.

By the above liquid crystal display of the present embodiment, the reflectance in the display panel 81 is in a range from 1 percent to 30 percent, while the transmittance becomes 4 percent to 10 percent, that is, the values can be set within the range of the region "c" shown in FIG. 18. Due to this, the liquid crystal display of the present embodiment can secure a luminance of the display light equivalent to that of a liquid crystal display performing only transmission type display even with the luminance of a conventional backlight, can secure the characteristics of the reflection type, and can realize a display having a high viewability even when the sunlight, illumination light, or other external light is dim.

Accordingly, as in the embodiment, by using a color filter covering only the transmission region of the pixel region, a thin film transistor TFT using low temperature polycrystalline silicon, and a reflection electrode in which a reflection region made of a metal of a high reflectance such as silver or aluminum has the function of scattering, color display is achieved in only the transmission type display, and black and white display is achieved in the reflection type display, but both of the reflectance and the transmittance can be improved and both of the viewabilities of the reflection type display and the transmission type display can be enhanced.

Third Embodiment

Next, an explanation will be given of a third embodiment of the present invention in relation to FIG. 19 to FIG. 21.

The liquid crystal display of the present embodiment has the same basic structure as that of the liquid crystal displays explained in the first and second embodiments. However, in the liquid crystal display of the present embodiment, the configuration of the reflection film is different.

Figure 19:
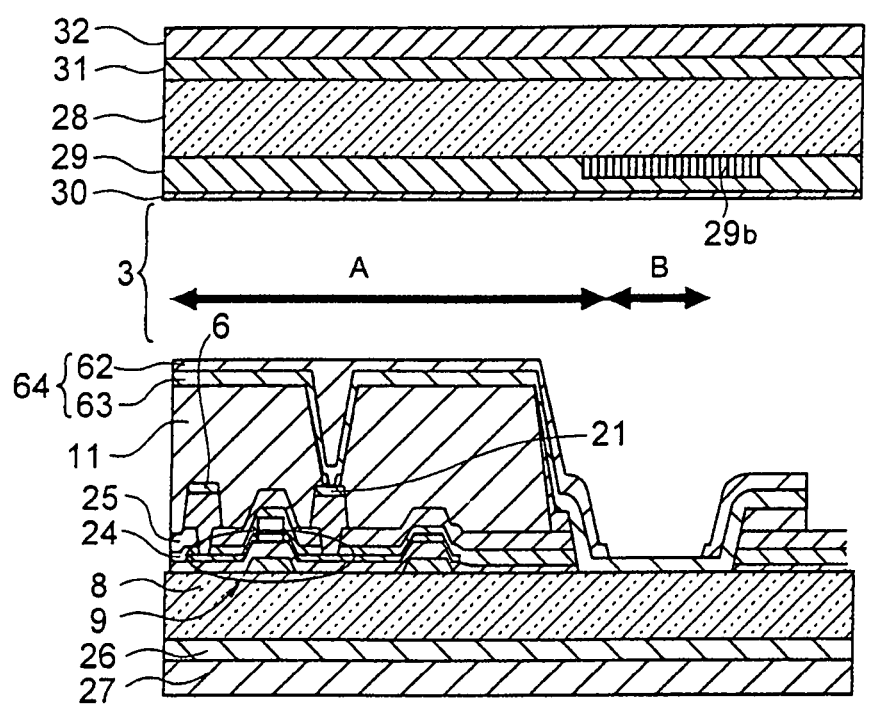
FIG. 19 is a sectional view of the structure of the display panel of a liquid crystal display according to a third embodiment of the present invention.

FIG. 19 is a sectional view of the structure of a display panel 61 in the liquid crystal display of the present embodiment. The structure of the display panel shown in FIG. 19 is basically the same as that of FIG. 16. However, in the display panel 61 of FIG. 19, the surface of the reflection region A of the reflection electrode 62 is a smooth surface.

Note that, in FIG. 19 to FIG. 21, the same notations are attached to similar components to those of the liquid crystal displays of the first and second embodiments.

The surface of the reflection electrode 62 preferably has a surface center line average roughness (Ra) of 0.02 μm or less. Further, the reflection electrode 62 is made of a conductive metal film such as rhodium, titanium, chromium, silver, aluminum, and Chromel as explained above. The reflectance in the reflection type display becomes high particularly when silver is used.

In the first and second embodiments, as shown in FIG. 2 and FIG. 16, relief shapes of the reflection region A of the reflection electrode 12 are prepared using the scattering layer 10. This is aimed at the diffusion of the reflection light by making the light strike the liquid crystals at random at the time of reflection type display, but dispersion of the reflection light striking the liquid crystals is forced, so the reflectance is lowered more than that of the reflection film in the smooth state.

In the third embodiment, the reflectance is ma highest by smoothening the reflection film in order to make the peak of the reflection the maximum. In this case, the reflection light is concentrated, and the viewability of the display screen suffers from directivity, but generally the greatest reduction in the viewability of the transmission type display occurs in a case where sunlight strikes the eyes by direct reflection. Viewability need only be secured at this time. Namely, the reflectance is set at the maximum, and the viewability of the reflection type display is made the maximum only for the portion where the viewability of the transmission type display is not secured.

Accordingly, in the present embodiment, desirably the smooth reflection layer causing regular reflection is formed as the reflection region A.

In the third embodiment, in the same way as the second embodiment, the thin film transistor (TFT) 9 is formed by using low temperature polycrystalline silicon as the semiconductor thin film layer. Further, the color filter 29b is arranged so as to cover not the entire surface of the pixel region 64, but only the transmission region B.

In the reflection region A, no color filter is provided, so the absorption of light and the reduction of the luminance due to the color filter are reduced.

Further, in contrast to the display of one dot on the screen by three pixels of R, G, and B in the case of color display, in the case of black and white display, one pixel displays one dot, so the number of displayed pixels becomes substantially three times that of the color display and the reflectance can be improved up to 30 percent at the maximum.

Further, the smooth reflection region A of the reflection electrode 62 is formed just above the regions where interconnects such as the gate line 5, signal line 6, and the CS line 7 are formed or the region where the TFT 9 is formed (below, these regions will be referred to as the "interconnect regions"). The light cannot pass through the above interconnect regions, so they cannot serve as parts of the transmission region. By forming the reflection region A by effectively utilizing such regions, the opening area of the transmission region B can be obtained at the maximum limit up to the remaining area of the pixel region. In this case, these parts are arranged so that the reflection film electrode 62 covers one side of the gate line 5, the signal line 6, the CS line 7, or other interconnects.

FIG. 20A to FIG. 20D and FIG. 21A to FIG. 21D are views of examples of forming the reflection region A just above the interconnect region in a structure wherein the CS line 7 and the gate line 5 are independent.

Figure 20A:
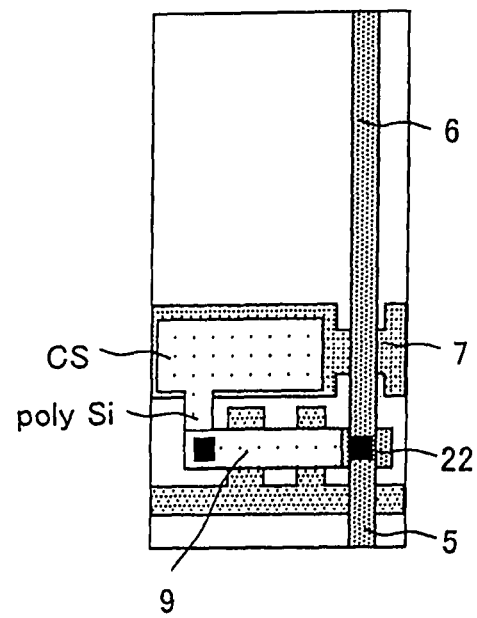
FIG. 20A shows a first example of the layout of the pixel region in the liquid crystal display according to the third embodiment of the present invention.

FIG. 20A is a plan view of the pixel region in a liquid crystal display. In this pixel region, the gate line 5, the signal line 6, and the CS line 7 made of the metal film are provided, and the gate line 5 and the CS line 7 are independent. The reflection region A of the reflection electrode 62 is formed in the region just above either one of the gate line interconnect region made of the metal film, the signal line interconnect region, the CS line interconnect region, and the region where the thin film transistor 9 (TFT) is formed or a region formed by combining a plurality of these regions.

Figure 20B:
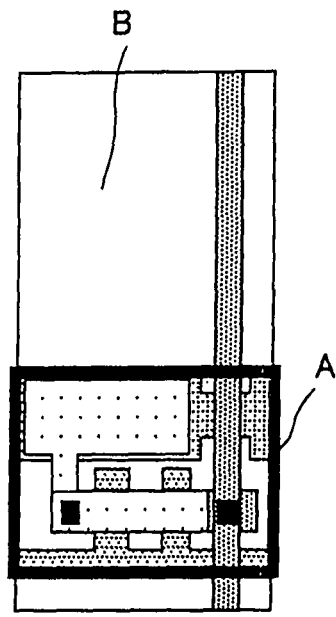
FIG. 20B to FIG. 20D are views showing arrangement locations of the reflection region in the pixel region.
Figure 20C:
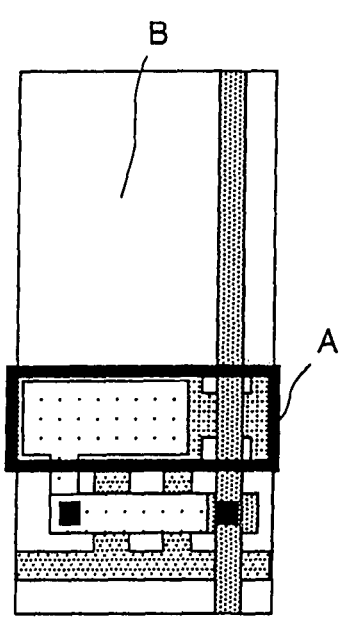
Figure 20D:
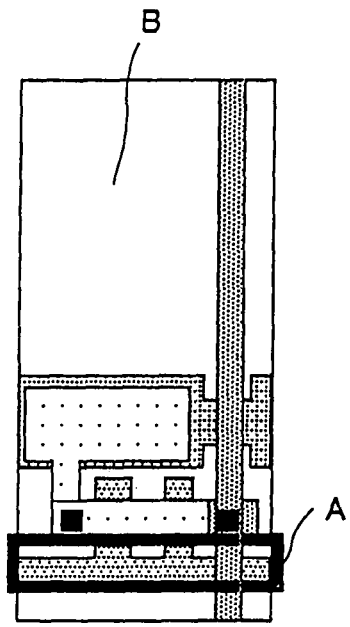
Figure 21A:
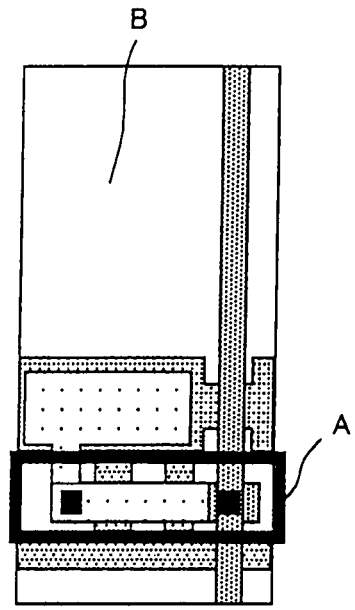
FIG. 21A to FIG. 21D are views of arrangement locations of the reflection region in each pixel region in the liquid crystal display according to the third embodiment of the present invention continued to FIG. 20D.
Figure 21B:
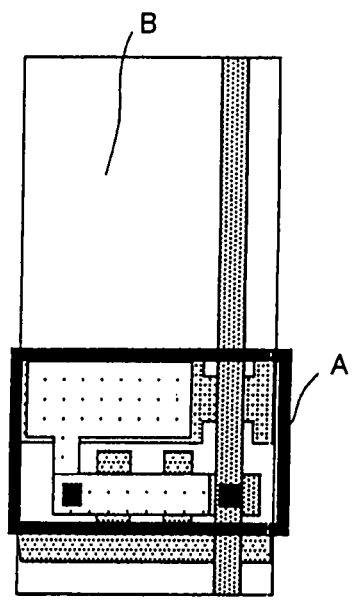
Figure 21C:
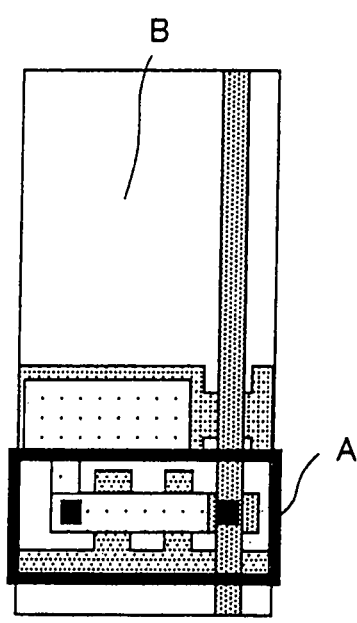
Figure 21D:
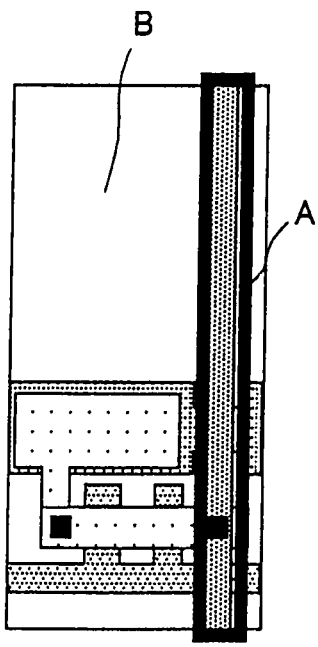

FIG. 20B shows a case where the gate line interconnect region, the CS line interconnect region and the TFT region are used as the reflection region A; FIG. 20C shows a case where only the CS line interconnect region is used as the reflection region A; FIG. 20D shows a case where only the gate line interconnect region is used as the reflection region A; FIG. 21A shows a case where only the TFT region is used as the reflection region A; FIG. 21B shows a case where only the CS line interconnect region and the TFT region are used as the reflection region A; FIG. 21C shows a case where the gate line interconnect region and the TFT region are used as the reflection region A; and FIG. 21D shows a case where only the signal line interconnect region is used as the reflection region A.

By effectively using the space in the pixel region in this way, a large area of the transmission region B can be secured, and the transmittance can be improved.

Fourth Embodiment

Next, an explanation will be given of a fourth embodiment of the present invention in relation to FIG. 22 and FIG. 23.

Figure 22:
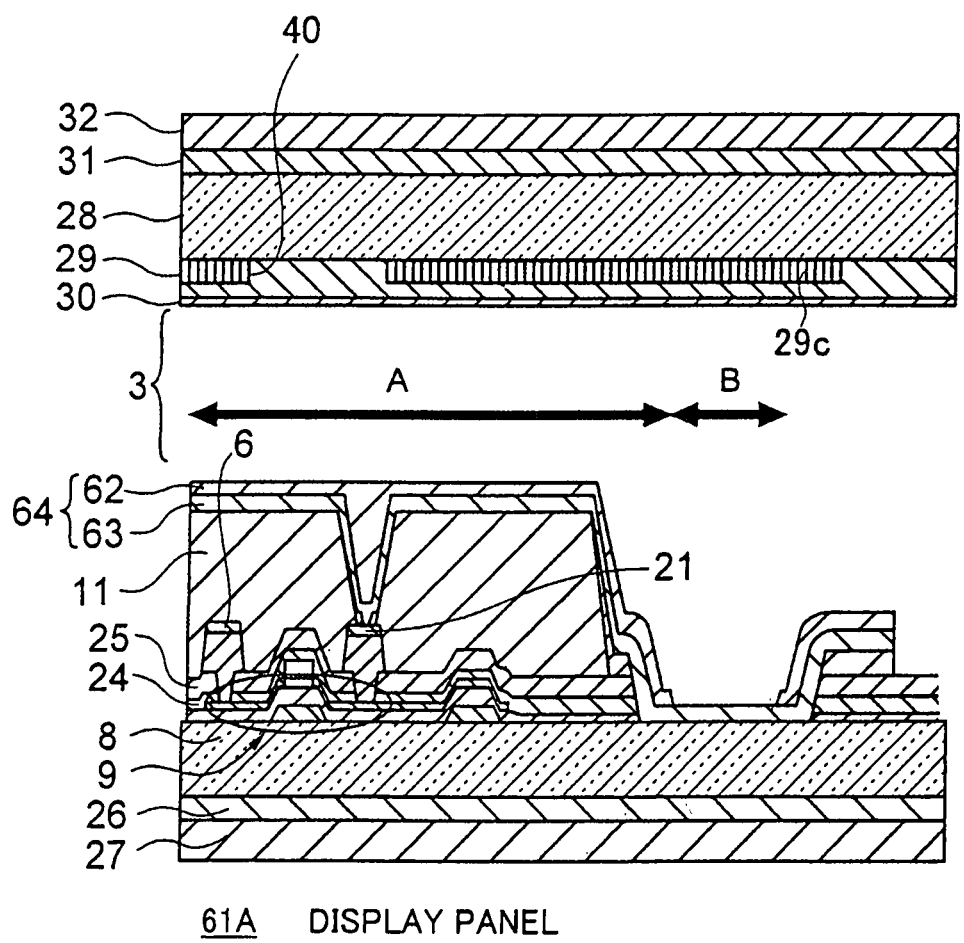
FIG. 22 is a sectional view of the structure of the display panel of a liquid crystal display according to a fourth embodiment of the present invention.
Figure 23:
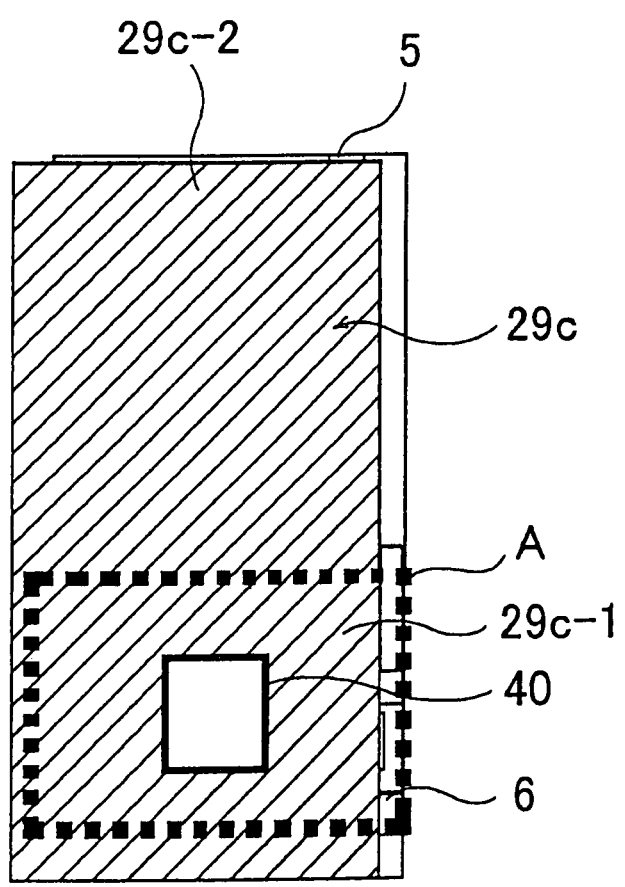
FIG. 23 is a view of an example of the formation of an opening formed in a color filter.

FIG. 22 is a sectional view of the structure of a display panel 61A in the liquid crystal display of the present embodiment. The structure of the display panel shown in FIG. 22 is basically the same as that of FIG. 19. In FIG. 22, the same notations are attached to similar components to those of the liquid crystal displays of the first and second embodiments.

The liquid crystal display of the fourth embodiment has a different color filter forming region from that of the liquid crystal display explained in the third embodiment explained above, but otherwise has the same basic structure.

In the fourth embodiment, the color filter 29c is a resin layer colored, for example, to R, G, and B by a pigment or dye similar to the first and second embodiments and is formed so as to be located facing the pixel region 4 including the reflection region A and the transmission region B. Note, in the color filter 29c, an opening 40 is formed in a portion corresponding to the reflection region A.

The opening 40 is a region provided since the color filter is not formed. When for example the region shown in FIG. 20B is used as the reflection region A, as shown in FIG. 23, it is provided as a square opening at a location corresponding to approximately the center thereof and formed with a ratio of 10 percent to 90 percent with respect to the area of the entire color filter 29c-1 corresponding to the reflection region A.

The light passing through the opening 40 does not pass through the color filter 29c colored to different colors, so is not colored, and light having a small attenuation is obtained. Further, in the liquid crystal display, at the time of reflection type display, by using the light passed through this opening 40 as the display light together with the light passed through the color filter 29c, the reflectance, the luminance, and the color reproducibility in the entire reflection type display can be improved.

The light passed through the opening 40 explained above can be adjusted in amount according to the size of the opening 40. Accordingly, in the liquid crystal display, by changing the size of the opening 40 formed in the color filter 29c within the above range, the reflectance and the luminance in the reflection type display can be adjusted. For this reason, in the liquid crystal display, by forming the entire color filter 29c with a thickness and by a material different from those of the portion 20c-2 corresponding to the transmission region B, it becomes unnecessary to adjust the reflectance and the luminance in the reflection type display. Accordingly, in the liquid crystal display, the color filter 29c-1 and the color filter 29c-2 can be easily formed under the same conditions, specifically the same film thickness, the same material, and the same step, the reflectance in the reflection type display and further the luminance and the color reproducibility are improved without increasing the production steps, and therefore the viewability of the reflection type display can be improved.

Further, in the liquid crystal display, the luminance in the reflection type display can be improved by enlarging the opening 40 without raising the ratio of the reflection region A, so the size of the transmission region B can be maintained as it is. Accordingly, in the liquid crystal display, reflection type display of a high reflectance and a high luminance is realized, a structure stressing the transmission type having a large area of the transmission region B and maintaining the luminance in the transmission type display at a high level can be employed, and the color reproducibility and the viewability in the transmission type display can be improved.

The opening 40 is not limited to the one opening exhibiting the square shape explained above, but may be triangular, hexagonal, or other polygonal or circular and also may be two or more in number. However, when the opening 40 is given a polygonal shape, a difference arises in the amount of light between the incident light from the outside and the reflection light to the outside, so using a circular opening by which the amount of the reflection light becomes equal with respect to any incident light improves the efficiency of utilization of the reflection light. Accordingly, the opening 40 is preferably formed circular. Further, for a similar reason to why the circular opening 40 is good, even in the case where the opening 40 has a polygonal shape, a point symmetric polygon is preferred.

Further, the opening 40 can be formed at any place within the range of the color filter 29c-1 corresponding to the reflection region A other than the location corresponding to approximately the center of the reflection region A explained above, but when arranging this in the vicinity of the transmission region B, it becomes a cause of leakage of the light from the internal light source from the opening 40 at the time of transmission display, therefore, preferably it is formed so as to be located at approximately the center of the reflection region A.

The opening 40 is desirably formed to a size enabling easy pattern precision, for example 20 μm or more when for example the shape of the opening 40 is circular, when taking into consideration the fact that a negative pattern is used as the material of the color filter when forming the color filter 29c by photolithography and a 1 μm or more film thickness is required for achieving the function as a color filter. Further, the color filter 28 corresponding to the reflection region A cannot be eliminated, so the size of the opening 40 must be not more than the size of the reflection region A. Note that, if the photosensitivity and dimensional precision of the color filter material used in the photolithography are improved, further micro processing will become possible. Therefore, the size of the opening 40 is not limited to the above range and may be the opening width. Specifically, when the opening 40 is circular, it may be the diameter, and when the opening 40 is polygonal, a distance between opposite sides or a distance between the side and the vertex may be 1 μm or more.

Then, by providing the opening 40 in the color filter 29c-1 corresponding to the reflection region A as explained above, the reflection region A of a high reflectance can be obtained, for example, the area of the reflection region A for obtaining the viewability of at least the required level can be reduced, and, as a result, a liquid crystal display of a structure stressing the transmission type able to secure a large transmission region B can be easily realized. For this reason, the color reproducibility in the transmission type display is improved by a large transmission region B and, at the same time, the viewability can be improved by the high luminance transmission type display.

Fifth Embodiment

Next, an explanation will be given of a fifth embodiment of the present invention in relation to FIG. 24 to FIG. 29.

In the first to fourth embodiments explained above, an explanation was given of a liquid crystal display wherein the Cs line 7 was independently interconnected and an auxiliary capacitor C was formed between this Cs line 7 and the connection electrode 20, but the present invention is not limited to a liquid crystal display having such a configuration.

Figure 24:
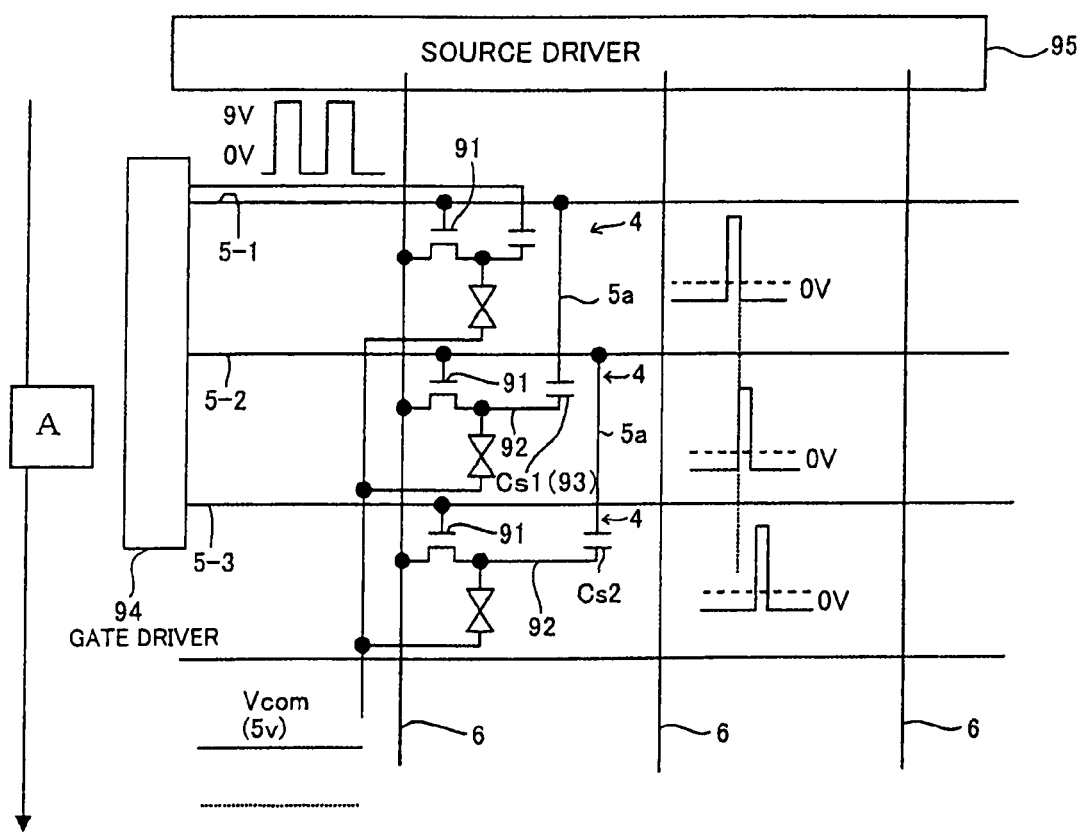
FIG. 24 is a view for explaining a liquid crystal display according to a fifth embodiment of the present invention and an equivalent circuit diagram of a liquid crystal display having a Cs-on-gate structure.

Therefore, the fifth embodiment is configured so as to be applied also to a liquid crystal display having a so-called Cs-on-gate structure formed, for example as shown in FIG. 24, without independently laying a Cs line, but imparting the role of the Cs line to the gate line and superimposing an auxiliary capacitor on this gate line.

A liquid crystal display having the Cs-on-gate structure, as shown in FIG. 24, is provided with pixel regions 4 formed into a matrix by laying a plurality of gate lines 5 and a plurality of signal lines 6 perpendicular to each other. A TFT portion 91 where a TFT is formed at an intersecting point of a gate line 5 and a signal line 6 is formed for every pixel region 4. Each gate line 5 is provided with an extension 6a extending along the signal line 6 to the opposite side from the connection side with the TFT portion 91. Further, in the pixel region 4, a connection electrode 92 connected to the TFT via the TFT portion 91 is laid so as to face an extension 5a of the gate line 5 of the previous stage. In the liquid crystal display having such a constitution, a superimposed portion of the extension 5a of the gate line 5 of the previous stage and the connection electrode 92 is used as an auxiliary capacitor region in which the auxiliary capacitor is formed (hereinafter referred to as a "Cs region") 93.

Further, in FIG. 24, each gate line 5 is driven by a gate driver 94, and each signal line 6 is driven by a source driver 95.

Figure 25:
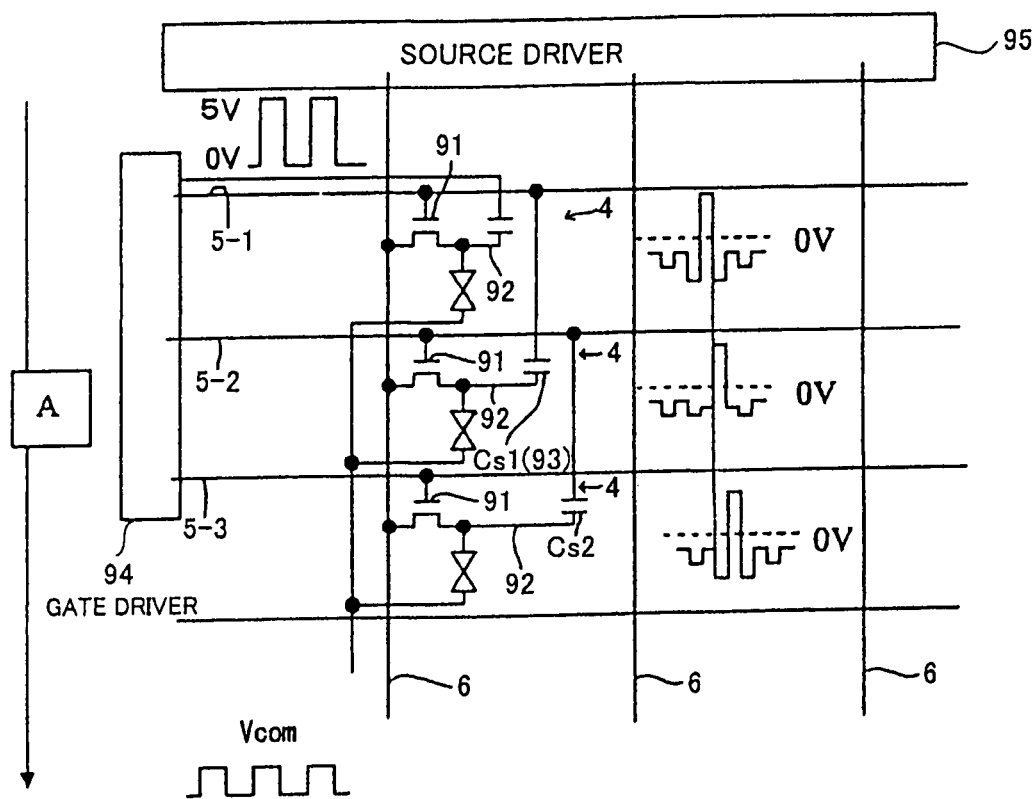
FIG. 25 is an equivalent circuit diagram of a liquid crystal display employing a driving method different from FIG. 24.

Further, FIG. 25 is an equivalent circuit diagram of a liquid crystal display employing a driving method different from that of FIG. 24.

In the circuit of FIG. 24, a constant common potential Vcom was supplied, but the circuit of FIG. 25 employs a driving method applying a counter voltage Vcom obtained by inverting the polarity for every 1 H. In this case, while a signal potential of 9V was necessary in the circuit of FIG. 24, in the circuit of FIG. 25, a signal potential of 5V is satisfactory.

Figure 26:
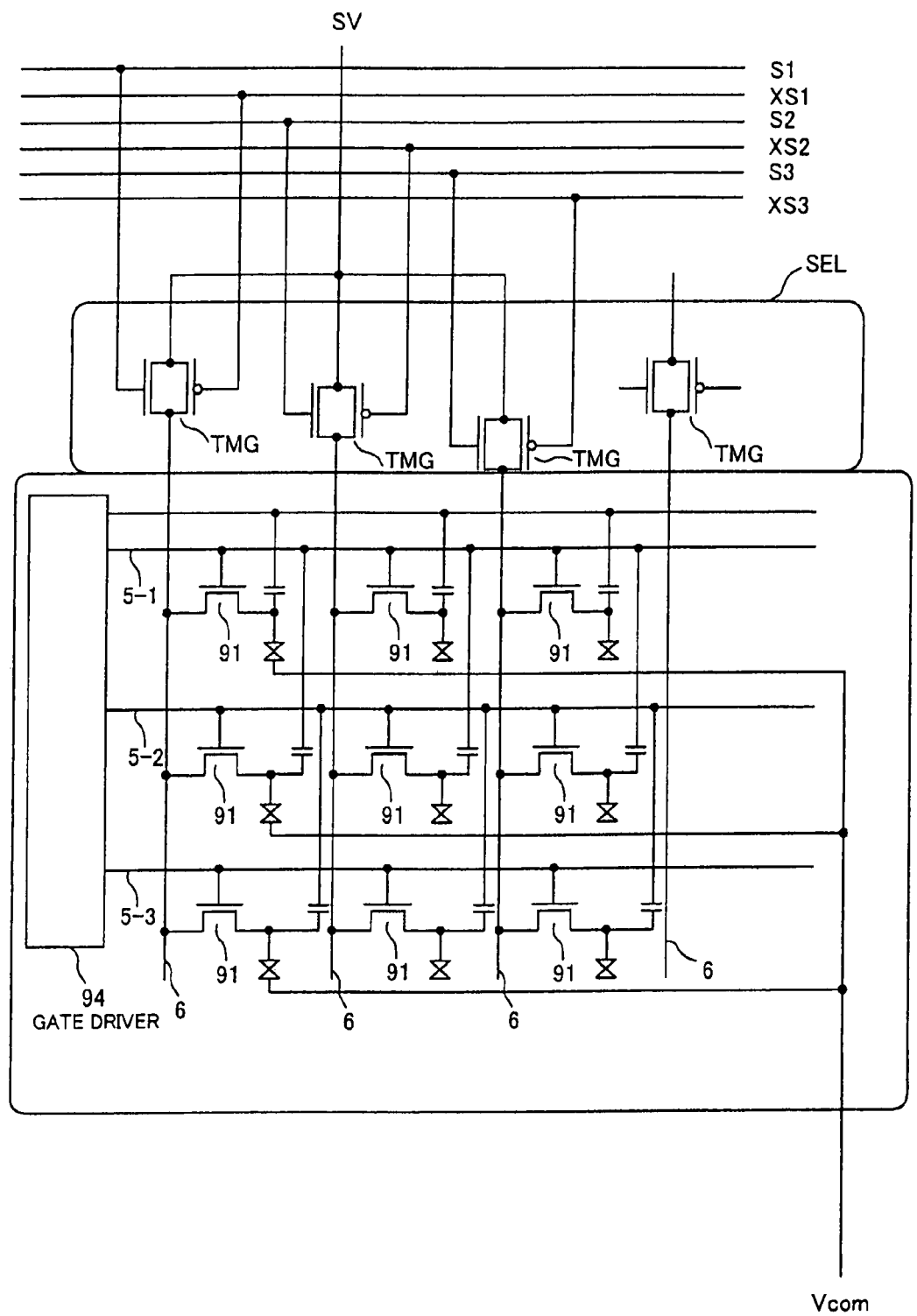
FIG. 26 is an equivalent circuit diagram of a liquid crystal display having a panel circuit of low temperature polycrystalline silicon.

Further, FIG. 26 is an equivalent circuit diagram of a liquid crystal display having a panel circuit of low temperature polycrystalline silicon. Note that, also in FIG. 26, the same notations are attached to similar components to those of FIG. 24 and FIG. 25.

The circuit of FIG. 26, different from the circuits of FIG. 24 and FIG. 25, employs a configuration wherein the source driver is not mounted on the same panel. A signal SV from a not illustrated source driver is transferred to the signal line 6 via a selector SEL having a plurality of transfer gates TMG. The transfer gates (analog switches) TGM are controlled in the conductive state by selection signals S1 and XS1, S2 and XS2, S3 and XS3, . . . taking complementary levels from the outside.

FIGS. 27A and 27B and FIGS. 28A and 28B are views of examples where the reflection region A is formed just above the interconnects in a so-called Cs-on-gate structure wherein the CS line 7 and the gate line 5 are shared.

Figure 27A:
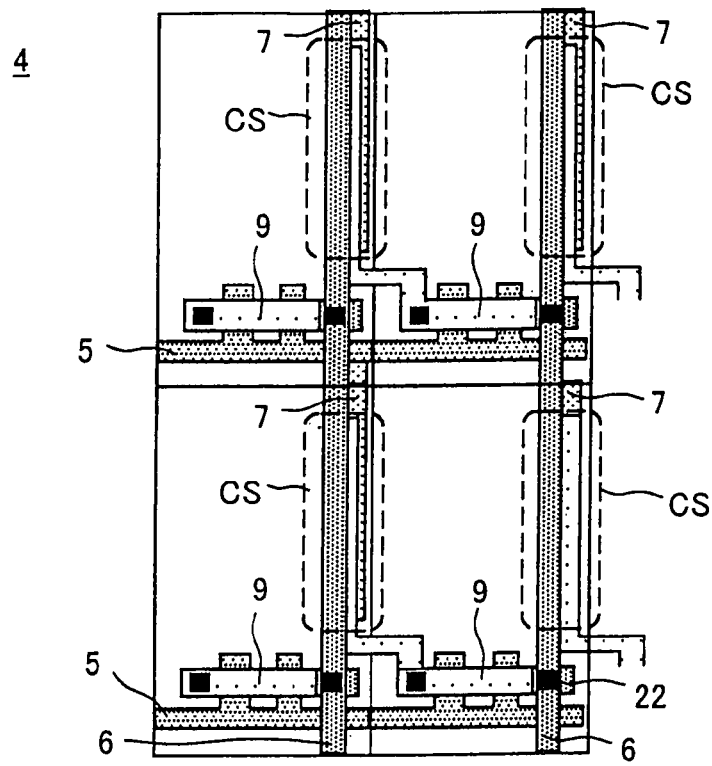
FIG. 27A shows a second example of the layout of the pixel region in the liquid crystal display according to the fifth embodiment of the present invention.

FIG. 27A is a plan view of 2×2 pixel regions. In these pixel regions, a plurality of gate lines 5 and a plurality of signal lines 6 are interconnected orthogonal to each other and form a matrix. A TFT 9 is formed at an intersecting point of the gate line 5 and the signal line 6 for each pixel.

Each gate line 5 is provided with a CS line 7 along the signal line 6 and at the side opposite to the connection side with the TFT 9. The CS line 7 is not independently laid. A storage capacitor CS is formed as illustrated between the gate line 5 and the gate line of the previous stage.

The reflection region A of the reflection electrode 62 is formed in the region just above either of the gate line interconnect region, the signal line interconnect region, the CS forming region, and the TFT forming region made of metal film or a region obtained by combining a plurality of these regions.

Figure 27B:
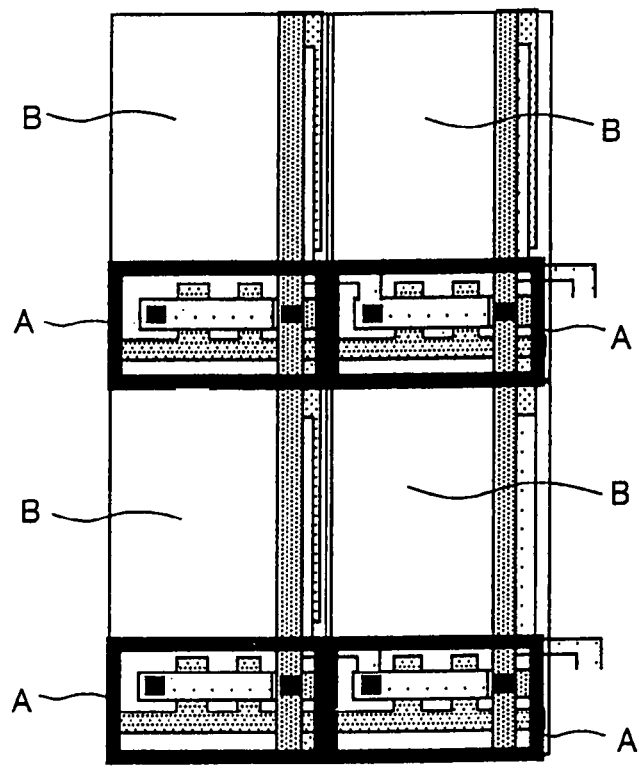
FIG. 27B is a view of the arrangement location of the reflection region in the pixel region.
Figure 28A:
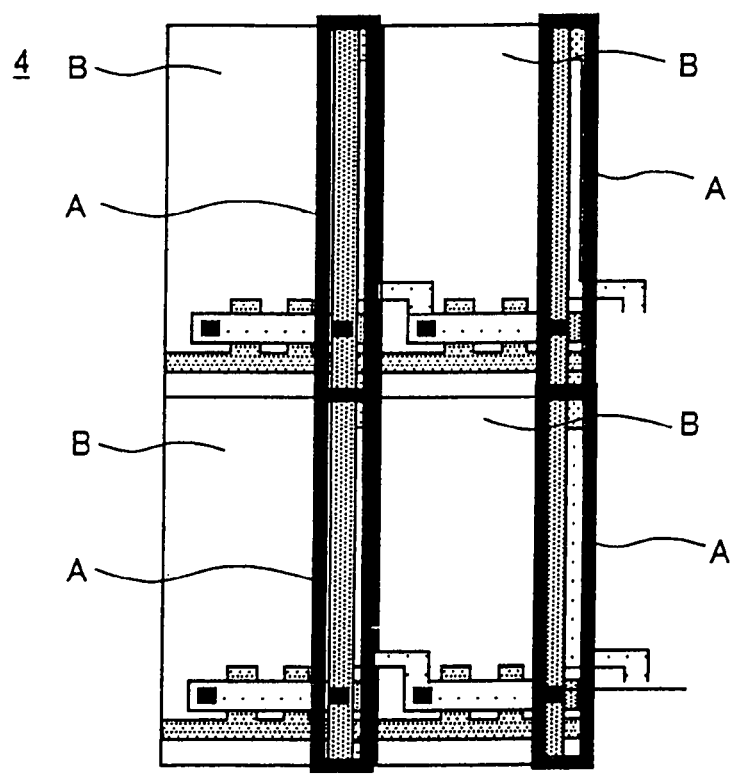
FIG. 28A and FIG. 28B are views showing the arrangement locations of the reflection region in each pixel region of the liquid crystal display according to the fifth embodiment of the present invention continued from FIG. 27B.
Figure 28B:
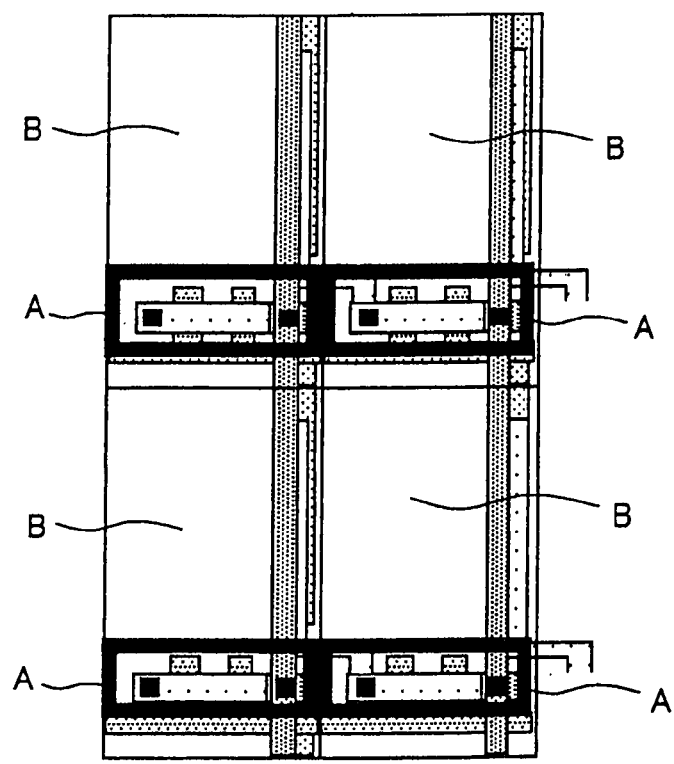
Figure 29:
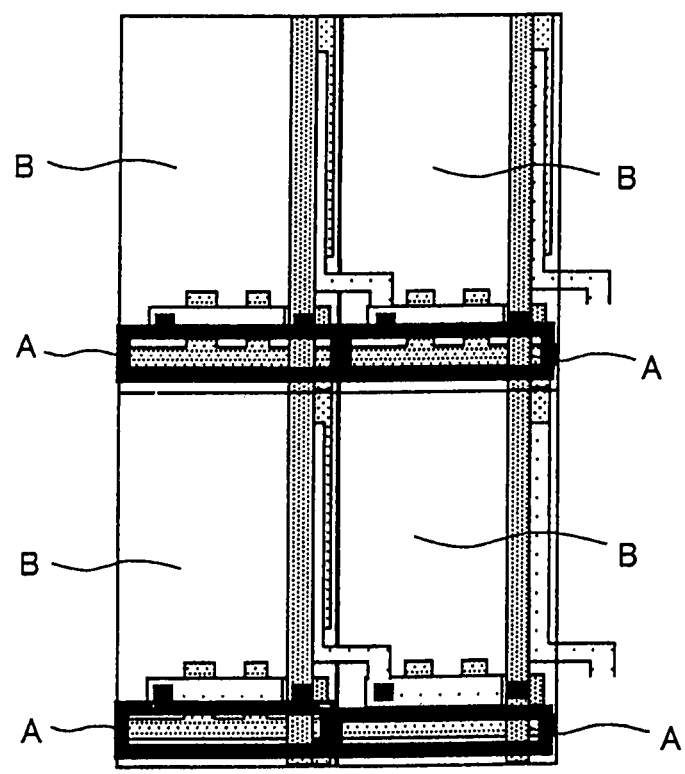
FIG. 29 is a view of the arrangement location of the reflection region in each pixel region of the liquid crystal display according to the fifth embodiment of the present invention continuing from FIG. 27B.

FIG. 27B shows a case where the gate line interconnect region and the TFT forming region are used as the reflection region A; FIG. 28A shows a case where only the signal line interconnect region is used as the reflection region A; FIG. 28B shows a case where only the TFT forming region is used as the reflection region A; and FIG. 29 shows a case where only the gate line is used as the reflection region A.

By effectively using the space in the pixel in this way, a large area of the transmission region B can be secured, and the transmittance can be improved.

In such a liquid crystal display as well, in the pixel region 4, the reflection region A is provided just above one of a region wherein a metal film such as a metal interconnect for blocking light from the backlight of the internal light source is provided, specifically a region wherein the above gate line 5 is laid or a region wherein the signal line 6 is laid, a region wherein the Cs region 93 is formed, the TFT portion 91 wherein a TFT is formed, or a region obtained by combining a plurality of these regions.

For example, in a pixel region 4 having a configuration as shown in FIG. 27A, the reflection region A is provided just above the Cs line interconnect region and the gate line interconnect region shown in FIG. 27B. In this way, by effectively utilizing the region for blocking light from the internal light source to form the reflection region A, the pixel region 4 can be divided to the reflection region A and the transmission region B. As a result, a structure stressing the transmission type can be formed by securing a large area of the transmission region B.

Further, in the above pixel region 4, by forming the opening 40 at a portion corresponding to the reflection region of the color filter (illustration is omitted) provided corresponding to this pixel region 4 and forming a smooth reflection electrode on the flattening layer, the reflectance and the transmittance in the display panel can be set in the above range, that is, the reflectance can be set to 10 percent or more, and the transmittance can be set in a range of 4 percent to 10 percent.

Next, an explanation will be given of the method of driving the liquid crystal display of FIG. 24 having the above Cs-on-gate structure. In the case of such a Cs-on-gate structure, in order to add the Cs capacitance function to the gate line of the previous stage, when the gate line of a certain stage is in the ON state, it is necessary to bring the gate line of the previous stage to the OFF state in order to suppress capacitance fluctuation. In this liquid crystal display, a constant common potential Vcom of for example 5V is applied, and the gate waveform becomes a waveform as shown in the same diagram.

In the liquid crystal display, the first gate line 5-1 is first set ON, then the gate potential is fixed at the OFF potential. Next, the second gate line 5-2 is set ON. At this time, a first gate line 5-1 having the Cs line function has been set OFF, and therefore the held charge of the pixel is injected into the auxiliary capacitor Cs1 (Cs region 93) connected to the first gate line 5-1 through the source and the drain of the TFT portion 91, and the pixel potential is decided. Then, the second gate line 5-2 is set OFF and, at the same time, the third gate line 5-3 is set ON, and similar to the storage capacitor Cs1 explained above, the held charge is injected into the storage capacitor Cs2 connected to the second gate line 5-2 and the pixel potential is decided.

Note that, in the above driving method, the scan direction is an arrow A direction in FIG. 10. Further, the OFF potential in this driving method is −3V, but the OFF potential was set at this voltage because a potential for completely cutting the current was a minus potential in Nch used in the TFT portion 91, and where the current cut potential of the TFT portion 91 is on the plus side, a GND potential can be naturally brought to the OFF potential.

The present invention was explained above based on the preferred embodiments, but the present invention is not limited to the embodiments explained above. Various modifications are possible within a range not out of the gist of the present invention.

The configurations of the liquid crystal displays explained in the above embodiments are examples. The present invention is not limited to the above configurations and can be applied to other configurations.

In the third and fourth embodiments, examples of the case of forming smooth reflection films just above the interconnect regions were given, but it is within the range of the present invention that a scattering film be formed just above the interconnect region to form the reflection region.

As explained above, according to the present invention, by setting the transmittance of the display panel of the liquid crystal display at 4 percent to 10 percent and setting the reflectance in the range from 1 percent to 30 percent, it becomes possible to deal with a high definition display while securing a display light luminance equivalent to that of a display device performing only transmission type display and a reflection display light luminance required for display without increasing the power consumption of the liquid crystal display.

Further, by providing a color filter covering only the transmission region, it becomes possible to further improve the reflectance.

Further, by providing an opening in the color filter corresponding to the reflection region, a reflection region of a high reflectance can be obtained, the area of the reflection region for obtaining the viewability of at least the required level can be reduced, and as a result a liquid crystal display stressing a transmission type able to secure a large transmission region can be realized.

Further, since low temperature polycrystalline silicon is used, the size of the thin film transistor TFT for every pixel can be reduced and the entire area of the reflection region and the transmission region increases. Further, by forming the reflection film made of a metal having a high reflectance or a smooth reflection film, particularly by forming this just-above an interconnect region, the area of the transmission region can be increased and both of the reflectance and the transmittance can be improved.

Accordingly, according to the present invention, in a dual reflection and transmission type liquid crystal display, the viewabilities and the color reproducibilities of both of the reflection display and the transmission type display can be improved.

INDUSTRIAL APPLICABILITY

As described above, the liquid crystal display according to the present invention can improve the viewability and the color reproducibility of both of the reflection display and the transmission type display, so can be applied to electronic apparatuses such as laptop type personal computers, displays for car navigation, personal digital assistants (PDA), mobile phones, digital cameras, and video cameras.

LIST OF REFERENCES 1, 61, 61A, 81.. liquid crystal panels
3.. liquid crystal layer
4.. pixel region
5.. gate line
6.. data signal line
7.. CS line
8.. transparent insulating substrate
9, 9a.. TFTs
10.. scattering layer
11.. flattening layer
12.. reflection electrode 13.. transparent electrode
14.. gate insulating film
15.. gate electrode
16, 17.. n+type diffusion layers
18.. semiconductor thin film layer
19.. source electrode
20.. drain electrode
21.. connection electrode
22.. contact hole
23.. stopper
24.. insulating film
24a, 24b... contact holes
25.. insulating film
26.. ¼ wavelength plate
27.. polarization plate
28.. transparent insulating substrate
29.. overcoat layer
29a, 29b, 29c... color filters
30.. counter electrode
31.. ¼ wavelength plate
32.. polarization plate
40.. TFT
41.. insulating film
41a, 41b.. contact holes
51.. drive circuit
52.. light source
53.. optical filter
54.. photodetector
55.. optical sensor
56.. measurement device
62.. reflection electrode
63.. transparent electrode
64.. pixel region
71a, 71b.. backlights
72.. light guide plate
73.. diffusion plate
74.. lens sheet
CS.. storage capacitor
A.. reflection region
B.. transmission region

The invention claimed is:

1. A liquid crystal display having a pixel region with a plurality of pixels capable of displaying an image including a plurality of reflection portions for display by ambient light introduced from the outside and a plurality of transmission portions for display by light from an internal light source, wherein a reflectance of the light by the reflection portion of a selected pixel is 1 percent to 30 percent of the light incident thereon, for defining an entire display signal range from a lowest value to highest value and a transmittance of light by the transmission portion of a selected pixel is at most from 5 percent to 10 percent of the light incident thereon, for defining an entire display signal range from a lowest value to highest value, and further wherein the reflection electrode is formed exclusively in an interconnect region such that it is substantially centered over a conductor extending along the side of the pixel at which the reflection electrode is located and the reflection electrode has a center line average roughness of less than or equal to 0.02 micrometers and further wherein the reflection region is exclusively located above a Cs line interconnect region with an opening in the color filter being centered directly over the Cs line interconnect while maintaining the specified reflectance and transmittance characteristics.

2. A liquid crystal display as set forth in claim 1, wherein each of said reflection portions has a function of scattering the incident light.

3. A liquid crystal display as set forth in claim 1, wherein each of said reflection portions has a function of selectively reflecting the incident light.

4. A liquid crystal display as set forth in claim 1, wherein each of said reflection portions is comprised of a metal film having a high reflectance.

5. A liquid crystal display as set forth in claim 1, wherein a color filter is provided only at said transmission portions.

6. A liquid crystal display as set forth in claim 5, wherein the color filter is formed at a location corresponding to each pixel, and an opening is formed in said color filter at each of said reflection portions.

7. A liquid crystal display as set forth in claim 6, wherein said opening is formed at an approximate center of each of said reflection portions.

8. A liquid crystal display as set forth in claim 1, wherein, in said display panel, under conditions of irradiation of the light of said light source of 500 cd/m.sup.2 to 25000 cd/m.sup.2, the amount of the display light is 20 cd/m.sup.2 to 200 cd/m.sup.2.

9. A liquid crystal display as set forth in claim 1, wherein, in said display panel, under conditions of irradiation of the light of said ambient light of 2000 lx to 50000 lx, the amount of the display light is 200 cd/m.sup.2 to 1000 cd/m.sup.2.

10. A liquid crystal display as set forth in claim 1, wherein, in said pixel region, an area of said transmission portion is at least 40 percent of each pixel, and the area of said reflection portion is 1 percent to 60 percent of the overall pixel.

11. A liquid crystal display as set forth in claim 1, wherein, in said pixel region, an aperture ratio of said transmission portion is 40 percent to 100 percent of each pixel.

12. A liquid crystal display having a pixel region comprised of a plurality of individually addressable pixels, each pixel in the pixel region having a reflection region for display by ambient light introduced from the outside and a transmission region for display by light from an internal light source, wherein a reflectance of the light by the reflection region of a selected pixel is 1 percent to 30 percent of the light incident thereon, for defining an entire display signal range from a lowest value to highest value, and a transmittance of the light by the transmission region of a selected pixel is at most 5 percent to 10 percent of the light incident thereon for defining an entire display signal range from a lowest value to highest value, and further wherein the reflection electrode is formed exclusively in an interconnect region such that it is substantially centered over a conductor extending along the side of the pixel at which the reflection electrode is located and the reflection electrode has a center line average roughness of less than or equal to 0.02 micrometers and further wherein the reflection region is exclusively located above a Cs line interconnect region with an opening in the color filter being centered directly over the Cs line interconnect while maintaining the specified reflectance and transmittance characteristics.

13. A liquid crystal display as set forth in claim 12, wherein each of said reflection regions has a function of scattering the incident light.

14. A liquid crystal display as set forth in claim 12, wherein each of said reflection regions has a function of regularly reflecting the incident light.

15. A liquid crystal display as set forth in claim 12, wherein each of said reflection regions is formed by a metal film having a high reflectance.

16. A liquid crystal display as set forth in claim 12, wherein a color filter is provided in only said transmission regions.

17. A liquid crystal display as set forth in claim 16, wherein the color filter is formed at a location corresponding to said pixel region, and an opening is formed in said color filter in each of said reflection regions.

18. A liquid crystal display as set forth in claim 17, wherein said opening is formed at an approximate center of each of said reflection regions.

19. A liquid crystal display as set forth in claim 12, wherein, in said display panel, under conditions of irradiation of the light of said light source of 500 cd/m$^2$ to 25000 cd/m$^2$, the amount of the display light is 20 cd/m$^2$ to 200 cd/m$^2$.

20. A liquid crystal display as set forth in claim 12, wherein, in said display panel, under conditions of irradiation of the light of said ambient light of 2000 lx to 50000 lx, the amount of the display light is 200 cd/m$^2$ to 1000 cd/m$^2$.

21. A liquid crystal display as set forth in claim 12, wherein, in said pixel region, an area of said transmission region is at least 40 percent of the overall pixel region, and the area of said reflection region is 1 percent to 60 percent of the overall pixel region.

22. A liquid crystal display as set forth in claim 12, wherein, in said pixel region, an aperture ratio of said transmission region is 40 percent to 100 percent of the overall pixel region.

* * * * *